(12) United States Patent
Meriac et al.

(10) Patent No.: US 10,873,465 B2
(45) Date of Patent: Dec. 22, 2020

(54) CONTROL MECHANISMS FOR DATA PROCESSING DEVICES

(71) Applicant: ARM IP LIMITED, Cambridge (GB)

(72) Inventors: Milosch Meriac, Cambridge (GB); Daryl Wayne Bradley, Over (GB)

(73) Assignee: ARM IP Limited, Cambridge (GB)

( * ) Notice: Subject to any disclaimer, the term of this patent is extended or adjusted under 35 U.S.C. 154(b) by 88 days.

(21) Appl. No.: 15/501,559

(22) PCT Filed: Jul. 15, 2015

(86) PCT No.: PCT/GB2015/052048
§ 371 (c)(1),
(2) Date: Feb. 3, 2017

(87) PCT Pub. No.: WO2016/020640
PCT Pub. Date: Feb. 11, 2016

(65) Prior Publication Data
US 2017/0222815 A1    Aug. 3, 2017

(30) Foreign Application Priority Data

Aug. 5, 2014  (GB) .................................. 1413836.6
Sep. 26, 2014  (GB) .................................. 1417058.3

(51) Int. Cl.
*H04L 29/06* (2006.01)
*G06F 21/00* (2013.01)
(Continued)

(52) U.S. Cl.
CPC .......... *H04L 9/3247* (2013.01); *G06F 9/4406* (2013.01); *G06F 21/554* (2013.01);
(Continued)

(58) Field of Classification Search
CPC ............... H01J 49/0495; H01J 49/0418; H01J 49/0031; H01J 49/0409; G01N 27/622
See application file for complete search history.

(56) References Cited

U.S. PATENT DOCUMENTS 5,708,776 A     1/1998  Kikinis
5,845,117 A  *  12/1998  Fujita ..................... G06F 9/466
                                                                    718/107
(Continued)

FOREIGN PATENT DOCUMENTS

DE    10 2007 040094    2/2009
EP        1 653 321    5/2006
(Continued)

OTHER PUBLICATIONS

"Watchdog Timer", from https://web.archive.org/web/20131030075623/https://en.wikipedia.org/wiki/Watchdog_timer# Corrective_actions from Oct. 30, 2013 retrieved on Dec. 4, 2019, pp. 1-6.*
(Continued)

*Primary Examiner* — Lisa C Lewis
(74) *Attorney, Agent, or Firm* — Nixon & Vanderhye P.C.

(57) ABSTRACT

A method of controlling a data processing device, the method comprising: receiving, at the data processing device, a communication from a remote device wherein the communication comprises verification data; verifying the verification data at the data processing device; initiating an action by a watchdog associated with the data processing device based on the verification.

18 Claims, 15 Drawing Sheets

Figure 1A:
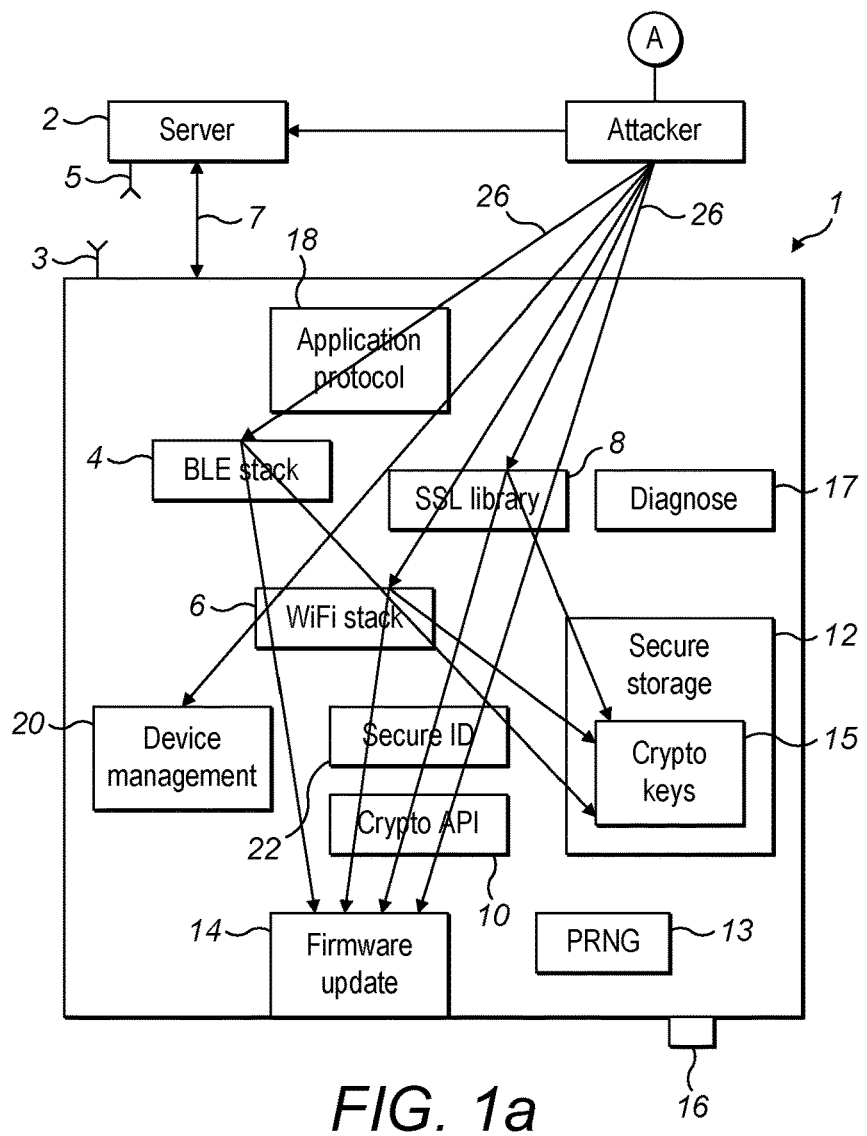

(51) Int. Cl.
| | |
|---|---|
| *H04L 9/32* | (2006.01) |
| *G06F 21/57* | (2013.01) |
| *G06F 21/55* | (2013.01) |
| *H04W 12/12* | (2009.01) |
| *G06F 9/4401* | (2018.01) |
| *H04W 12/00* | (2009.01) |

(52) U.S. Cl.
CPC .......... *G06F 21/572* (2013.01); *G06F 21/575* (2013.01); *H04L 9/3271* (2013.01); *H04W 12/1208* (2019.01); *G06F 2221/034* (2013.01); *G06F 2221/2103* (2013.01); *G06F 2221/2105* (2013.01); *G06F 2221/2111* (2013.01); *G06F 2221/2139* (2013.01); *G06F 2221/2141* (2013.01); *G06F 2221/2149* (2013.01); *G06F 2221/2151* (2013.01); *H04L 2209/80* (2013.01); *H04W 12/00502* (2019.01)

(56) References Cited

U.S. PATENT DOCUMENTS

| | | | | |
|---|---|---|---|---|
| 5,886,576 | A * | 3/1999 | Carlson | A61B 5/0275 |
| | | | | 330/207 A |
| 5,956,408 | A | 9/1999 | Arnold | |
| 6,098,117 | A * | 8/2000 | Foote | G06F 13/4095 |
| | | | | 710/8 |
| 6,539,480 | B1 | 3/2003 | Drews | |
| 6,976,163 | B1 | 12/2005 | Hind et al. | |
| 8,327,034 | B2 | 12/2012 | Nystad et al. | |
| 8,484,347 | B1 | 7/2013 | Gostev et al. | |
| 8,736,299 | B1 | 5/2014 | Pedersen | |
| 8,782,037 | B1 * | 7/2014 | Barad | G06F 17/2247 |
| | | | | 707/723 |
| 8,799,334 | B1 | 8/2014 | Stefanov et al. | |
| 9,177,122 | B1 | 11/2015 | Trier | |
| 9,407,758 | B1 * | 8/2016 | Pycko | H04M 3/16 |
| 9,767,317 | B1 * | 9/2017 | Chakrovorthy | G06F 21/71 |
| 2001/0051890 | A1 * | 12/2001 | Burgess | G06Q 10/06 |
| | | | | 705/7.14 |
| 2004/0054901 | A1 * | 3/2004 | England | H04L 63/12 |
| | | | | 713/168 |
| 2004/0268145 | A1 | 12/2004 | Watkins et al. | |
| 2007/0006303 | A1 | 1/2007 | Donnelly et al. | |
| 2007/0192854 | A1 | 8/2007 | Kelley | |
| 2007/0260738 | A1 | 11/2007 | Palekar | |
| 2008/0140163 | A1 * | 6/2008 | Keacher | G06F 19/3481 |
| | | | | 607/60 |
| 2008/0263198 | A1 | 10/2008 | Heen et al. | |
| 2008/0320312 | A1 * | 12/2008 | Duffus | G06F 21/88 |
| | | | | 713/189 |
| 2009/0007275 | A1 * | 1/2009 | Gehrmann | G06F 21/445 |
| | | | | 726/27 |
| 2009/0328164 | A1 | 12/2009 | Sunder et al. | |
| 2010/0082991 | A1 * | 4/2010 | Baldwin | H04L 9/083 |
| | | | | 713/176 |
| 2011/0131403 | A1 | 6/2011 | Ibrahim | |
| 2012/0072734 | A1 | 3/2012 | Wishman et al. | |
| 2013/0179669 | A1 | 7/2013 | Song | |
| 2013/0262642 | A1 | 10/2013 | Kutch | |
| 2014/0068585 | A1 | 3/2014 | Young et al. | |
| 2014/0082434 | A1 * | 3/2014 | Knight | G05B 19/0428 |
| | | | | 714/55 |
| 2014/0164773 | A1 | 6/2014 | Kotla et al. | |
| 2014/0189340 | A1 | 7/2014 | Hadley | |
| 2014/0221071 | A1 * | 8/2014 | Calio | G07F 17/3225 |
| | | | | 463/19 |
| 2014/0351882 | A1 | 11/2014 | Marvais | |
| 2015/0153911 | A1 | 6/2015 | Seymour | |
| 2015/0193620 | A1 | 7/2015 | Khatri | |
| 2016/0043924 | A1 * | 2/2016 | Cejnar | G06F 11/3006 |
| | | | | 709/224 |
| 2016/0132378 | A1 * | 5/2016 | Jung | G06F 11/0757 |
| | | | | 714/55 |
| 2016/0147996 | A1 | 5/2016 | Martinez | |

FOREIGN PATENT DOCUMENTS

| | | |
|---|---|---|
| EP | 1 659 810 | 5/2006 |
| EP | 1 796 340 | 6/2007 |
| EP | 2 743 827 | 6/2014 |
| GB | 2 329 266 | 3/1999 |
| WO | WO 03/067452 | 8/2003 |
| WO | WO 2007/090719 | 8/2007 |
| WO | WO 2007/097700 | 8/2007 |
| WO | WO 2011/083343 | 1/2011 |
| WO | WO 2017/021683 | 2/2017 |

OTHER PUBLICATIONS

International Preliminary Report on Patentability dated Feb. 16, 2017 in PCT/GB2015/052048, 12 pages.
Partial International Search Report for PCT/GB2015/052048 dated Sep. 24, 2015, 6 pages.
International Search Report for PCT/GB2015/052048 dated Dec. 1, 2015, 6 pages.
Written Opinion of the ISA for PCT/GB2015/052048 dated Dec. 1, 2015, 10 pages.
Search Report for GB1417058.3 dated Mar. 24, 2015, 5 pages.
Search Report for GB1417058.3 dated Oct. 13, 2015, 3 pages.
Search Report for GB1417058.3 dated Oct. 13, 2015, 2 pages.
[Internet Citation] "Alert Standard Format Specification", Apr. 23, 2003, 99 pages.
Examination Report dated Jan. 29, 2019 in GB Application No. 1513572.6, 6 pages.
U.S. Appl. No. 15/748,788, filed Jan. 30, 2018, Inventor: Luff et al.
U.S. Appl. No. 15/749,169, filed Jan. 31, 2018, Inventor: Austin et al.
International Search Report and Written Opinion of the ISA for PCT/GB2016/052370, dated Dec. 21, 2016, 14 pages.
Partial International Search Report for PCT/GB2016/052370, dated Oct. 27, 2016, 5 pages.
Combined Search and Examination Report for GB 1513586.6, dated Nov. 12, 2015, 7 pages.
Further Combined Search and Examination Report for GB 1513586.6, dated Jun. 13, 2016, 7 pages.
International Search Report and Written Opinion of the ISA for PCT/GB2016/052046, dated Sep. 2, 2016, 12 pages.
Combined Search and Examination Report for GB 1513572.6, dated Feb. 5, 2016, 3 pages.
Further Combined Search and Examination Report for GB 1513572.6, dated Jul. 28, 2017, 5 pages.
Office Action dated Jun. 26, 2019 for U.S. Appl. No. 15/749,169, 15 pages.
Office Action dated Oct. 4, 2019 for U.S. Appl. No. 15/748,788, 21 pages.
Office Action dated Aug. 5, 2020 for U.S. Appl. No. 15/748,788, 15 pages.

\* cited by examiner

CONTROL MECHANISMS FOR DATA PROCESSING DEVICES

This application is the U.S. national phase of International Application No. PCT/GB2015/052048 filed Jul. 15, 2015 which designated the U.S. and claims priority to GB Patent Application Nos. 1413836.6 filed Aug. 5, 2014 and 1417058.3 filed Sep. 26, 2014, the entire contents of each of which are hereby incorporated by reference.

The present techniques relate to the field of data processing. More particularly, the techniques generally relate to security of data processing/communicating devices.

The Internet of Things (IoT) encompasses devices that interact and communicate over both wired and wireless networks, including, for example, client devices and servers. Such devices may communicate with one another across a network and it is therefore desired that such communications can be trusted and relied upon to prevent and/or detect security risks and attempted acts of intrusion by third parties. Techniques are described to address such problems.

Viewed from a first aspect there is provided a method of controlling a data processing device, the method comprising: receiving, at the data processing device, a communication from a remote device wherein the communication comprises verification data; verifying the verification data at the data processing device; initiating an action by a watchdog associated with the data processing device based on the verification.

The method may further comprise: resetting a watchdog timer associated with the watchdog if the verification data is verified or initiating a security related action if the verification data is not verified.

The verification data may comprise a synchronised time value or counter value.

The communication may further comprise a verifiable identifier associated with the remote device, wherein the verifiable identifier may comprise a cryptographic signature of the remote device.

The method may further comprise: verifying the signature at the data processing device.

The communication received from the remote device may further comprise command data, wherein the command data may comprise code capable of initiating a response operation by the watchdog.

The response operation may comprise setting a timeout period for the watchdog timer, setting a boot source for a processing element associated with the data processing device, controlling access to a region of memory associated with the data processing device, and/or generating a request for data and/or code capable of executing on the data processing device; and causing the data processing device to transmit the request for data and/or code to the remote device, wherein the code capable of executing on the data processing device may comprise firmware.

The method may further comprise: generating, at the data processing device, a challenge communication comprising challenge data; transmitting the challenge communication payload to the remote device.

The method further comprise: receiving, at the data processing device, a response communication from the remote device in response to the challenge communication, wherein the response communication comprises the verification data, wherein the verification data may comprise a cryptographic nonce.

The method may further comprise: generating, using the watchdog, a status update; transmitting the status update to the remote device.

The method may further comprise: receiving, at the data processing device, a further communication from the remote device, wherein the further communication may comprise at least one credential; determining, using the watchdog, an authentication status of the at least one credential.

According to a second aspect, there is provided a data processing device comprising a processing unit, memory circuitry, communications circuitry and a watchdog having a watchdog timer associated therewith, wherein the data processing device may be configured to: receive a communication from a remote device, wherein the communication comprises verification data; verify the verification data; and wherein the watchdog initiates an action based on the verification.

According to a third aspect, there is provided a method of determining, at a remote device, a status of a data processing device, the method comprising: transmitting, from the remote device, a verification communication to the data processing device, wherein the verification communication comprises verification data; receiving, at the remote device, a status update communication; detecting, at the remote device, an anomaly in one or more operations executing on the data processing device based on the status update communication; initiating a response operation, at the remote device, in response to detection of the anomaly.

According to a fourth aspect, there is provided a method of activating a functionality on a data processing device the method comprising: generating, at the data processing device, a request communication comprising a request to access a restricted functionality of the data processing device; transmitting the request communication to a remote device; receiving, at the data processing device, an authorisation communication from the remote device wherein the authorisation communication comprises verification data and command data relating to control of a watchdog associated with the data processing device; verifying the verification data at the data processing device; initiating an operation by the watchdog in response to the command data.

The operation may comprise resetting a watchdog timer associated with the watchdog, setting a timeout period for the watchdog timer, and/or requesting data and/or code capable of executing on the device to activate the functionality.

According to a fifth aspect, there is provided a data processing device comprising a processing unit, memory circuitry, communications circuitry and a watchdog having a watchdog timer associated therewith, wherein the data processing device is configured to: generate a request communication comprising a request to access a restricted functionality of the data processing device; transmit the request communication to a remote device; receive an authorisation communication from the remote device, wherein the authorisation communication comprises verification data and command data relating to control of the watchdog; verify the verification data; and wherein the watchdog initiates an operation in response to the command data.

According to a sixth aspect, there is provided an apparatus capable of performing one or more operations and detecting an anomaly in the one or more operations, wherein in response to detecting the anomaly in the one or more operations, the apparatus is capable of initiating a response operation.

The apparatus may be configured to compare data received from a remote device with data stored or generated locally within the apparatus in order to perform the anomaly detection, wherein the data may comprise a cryptographic nonce, a time value, a counter value and/or a shared secret.

The apparatus may be configured to control a timeout component associated therewith based on the comparison.

The apparatus may be configured to operate in a secure state in which secure operations can be performed and a less-secure state in which less secure operations can be performed, wherein operations may execute in the secure state to detect anomalies in the less-secure state.

According to a seventh aspect, there is provided a method of detecting a security event on a data processing device comprising: monitoring one or more operations executing on the data processing device; detecting an anomaly in the one or more operations; initiating a response operation in response to detection of the anomaly.

Detecting the anomaly in the one or more operations may comprise: generating, at the data processing device, first verification data; receiving, at the data processing device, a communication from a remote device, wherein the communication comprises second verification data; comparing the first verification data and second verification data; detecting the anomaly when the first verification data and second verification data are different.

The method may further comprise: transmitting the first verification data from the data processing device to the remote device, wherein the first verification data and second verification data may comprise a cryptographic nonce, a time value or a counter value.

According to an eight aspect, there is provided an apparatus capable of performing one or more operations wherein the apparatus is configured to operate in a secure state in which secure operations can be performed and a less-secure state in which less secure operations can be performed, wherein when operating in the secure state the apparatus is capable of retrieving one or more software functions from a remote device and wherein, the apparatus is configured to execute the one or more software functions in the less secure state, wherein the operations may execute in the secure state to detect anomalies in the less-secure state.

The accompanying drawings illustrate many different aspects that may be implemented to provide security mechanisms for client, server and intermediate devices. Various aspects that may be used to enable secure end-to-end communication are illustrated, including features that may be implemented on one or more devices.

Figure 1B:
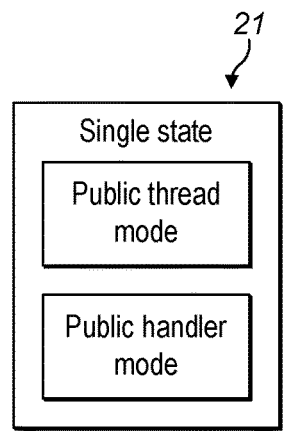
Figure 2A:
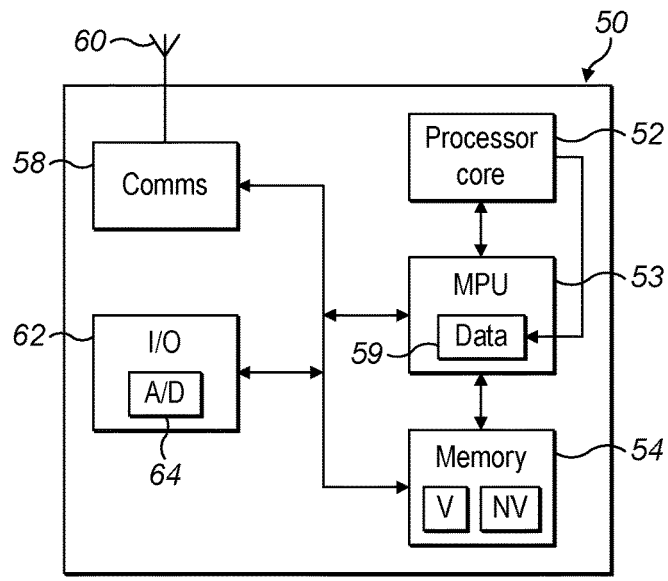
Figure 2B:
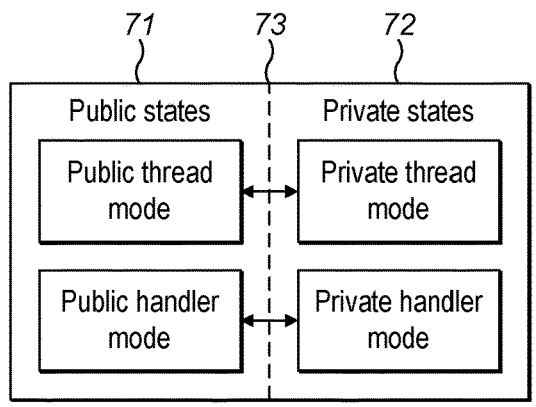
Figure 2C:
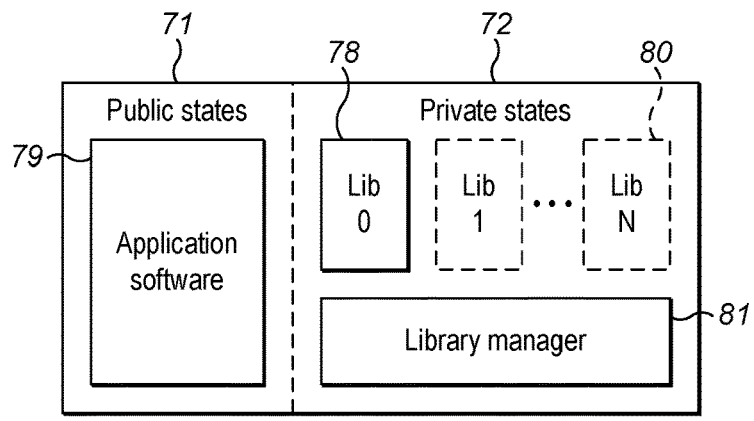

Embodiments will now be described, by way of example only, and with reference to the accompanying drawings of which:

FIG. 1a schematically shows an illustrative example of a data processing device;

FIG. 1b schematically shows an illustrative example of an operating state of a processing element of the data processing device of FIG. 1a;

FIG. 2a schematically shows a hardware embodiment of a data processing device for operating in accordance with at least some embodiments;

FIG. 2b schematically shows the operating states of a processing element of the data processing device of FIG. 2a;

FIG. 2c schematically shows an illustrative example of libraries within the operating states of the processing element of the data processing device of FIG. 2a.

Figure 3:
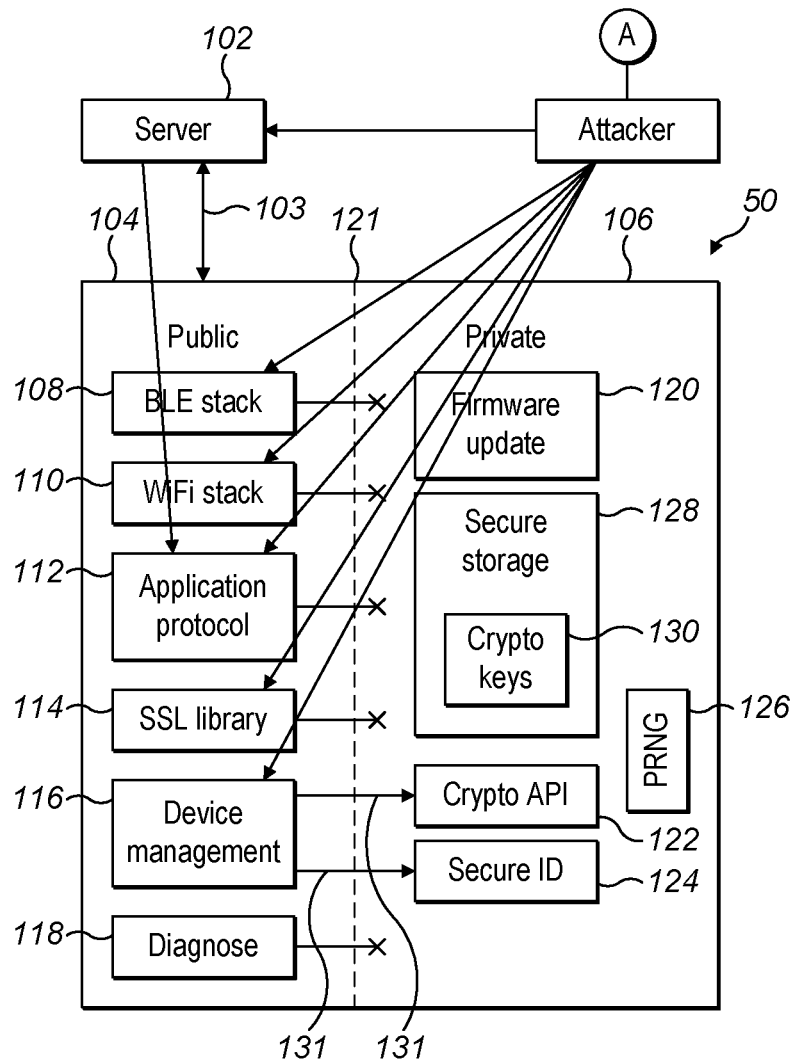
Figure 4:
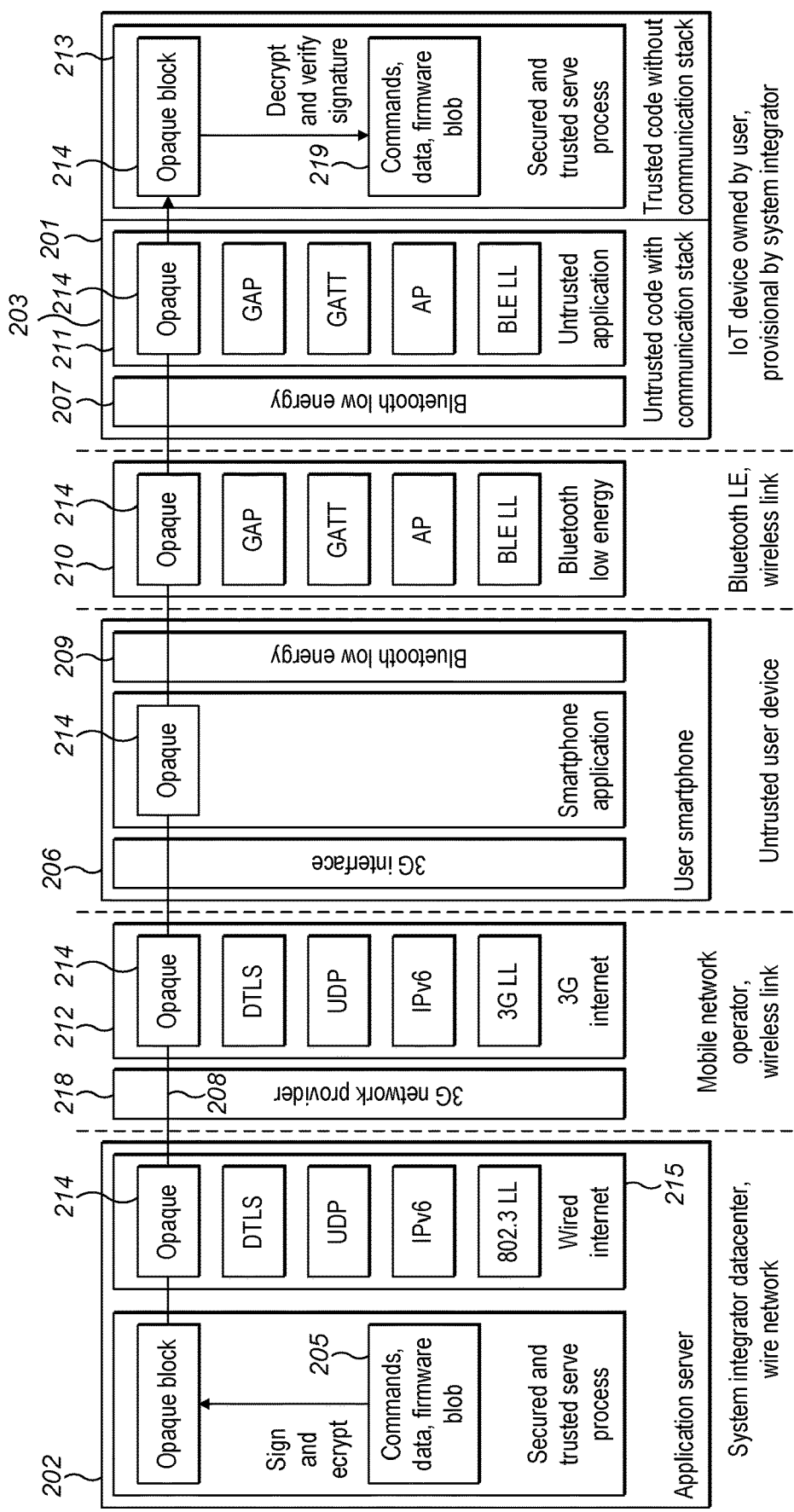
Figure 5A:
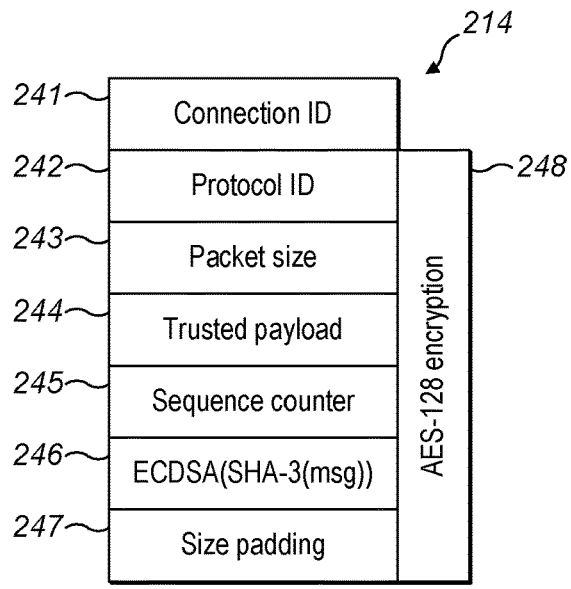
Figure 5B:
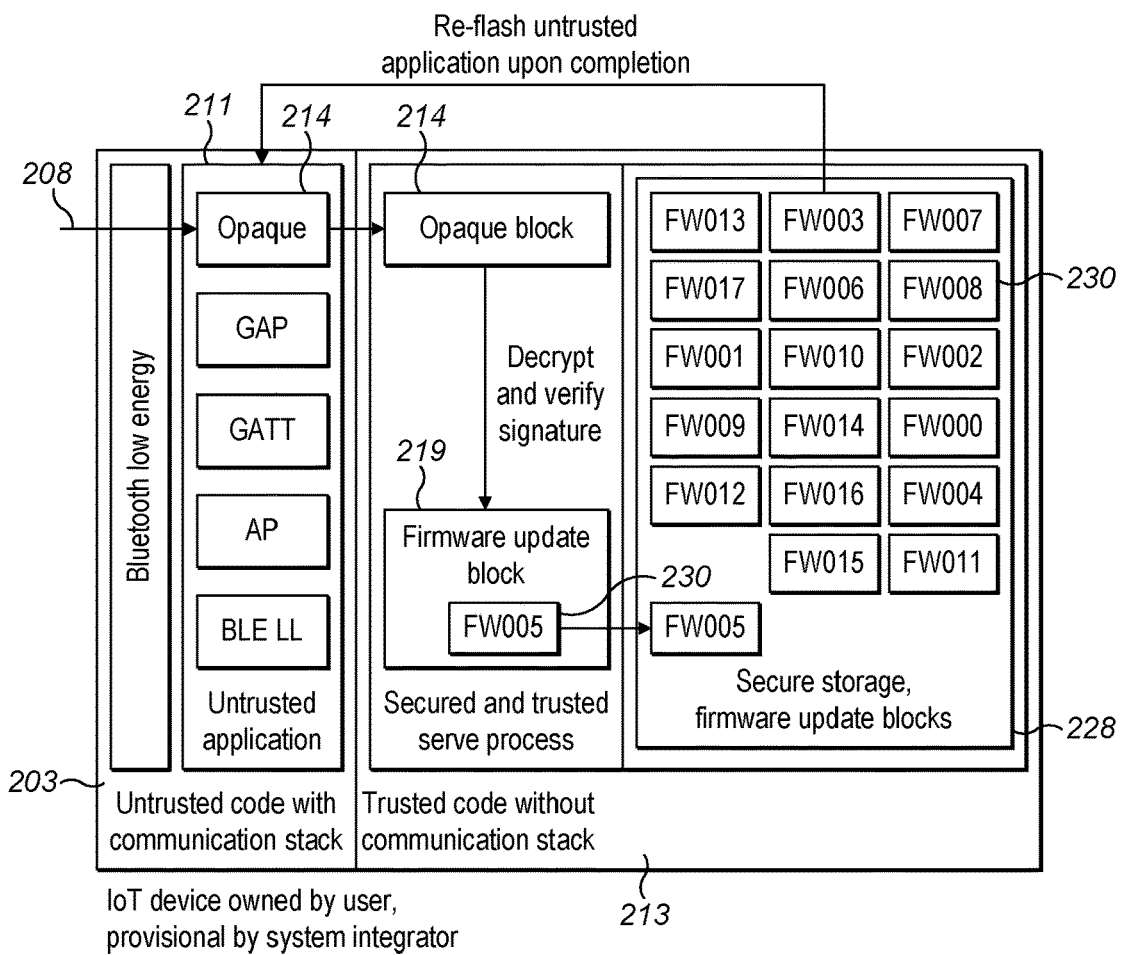
Figure 6:
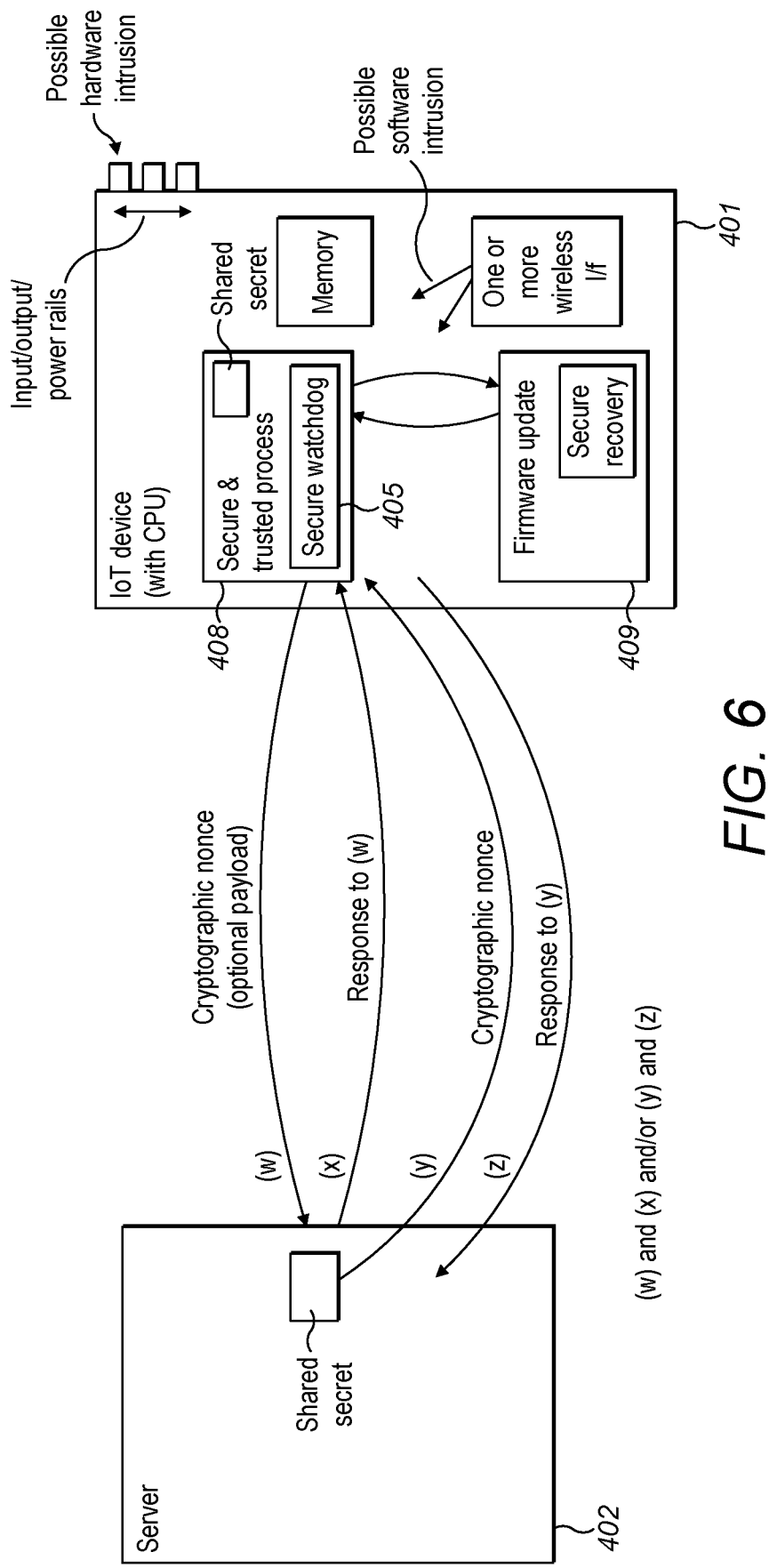
Figure 7A:
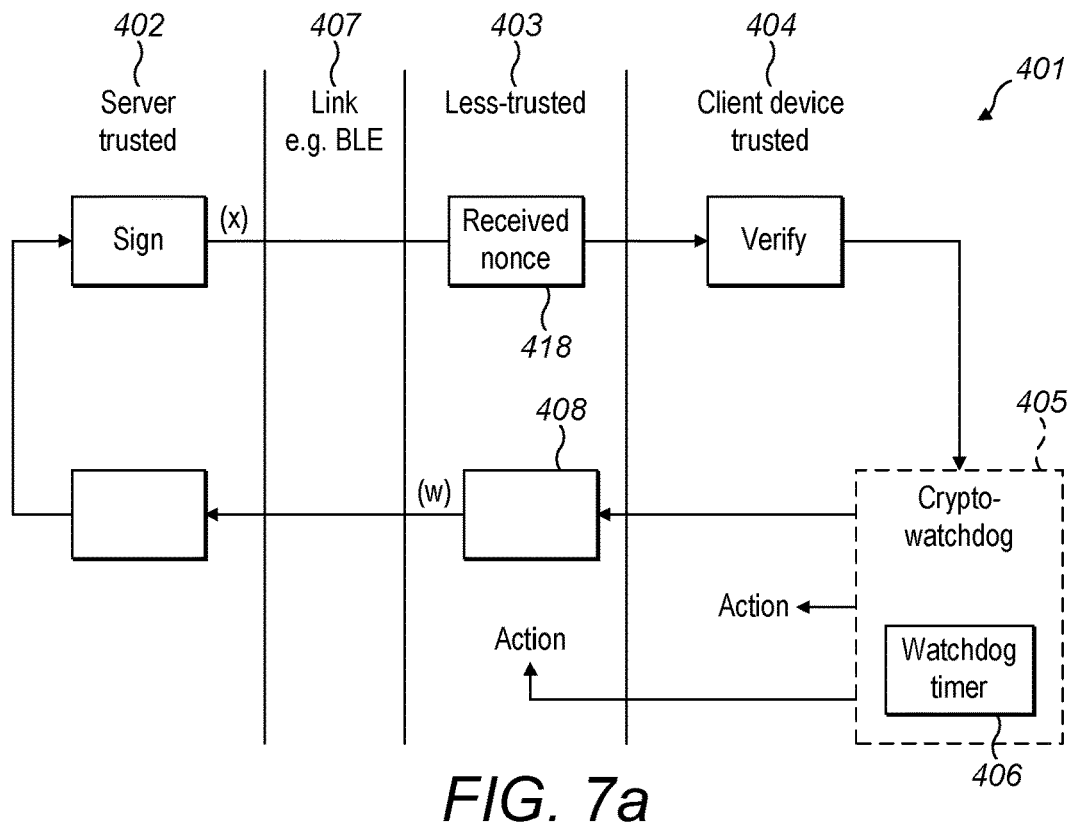
Figure 7B:
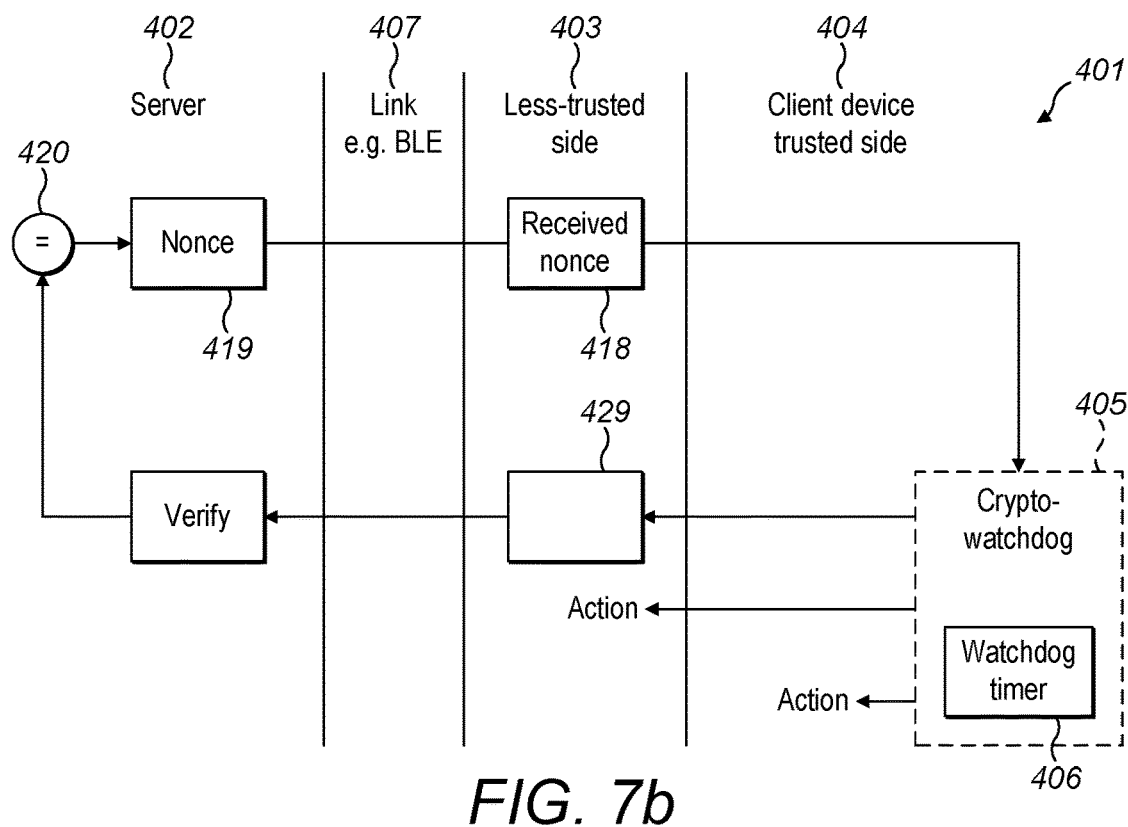
Figure 7C:
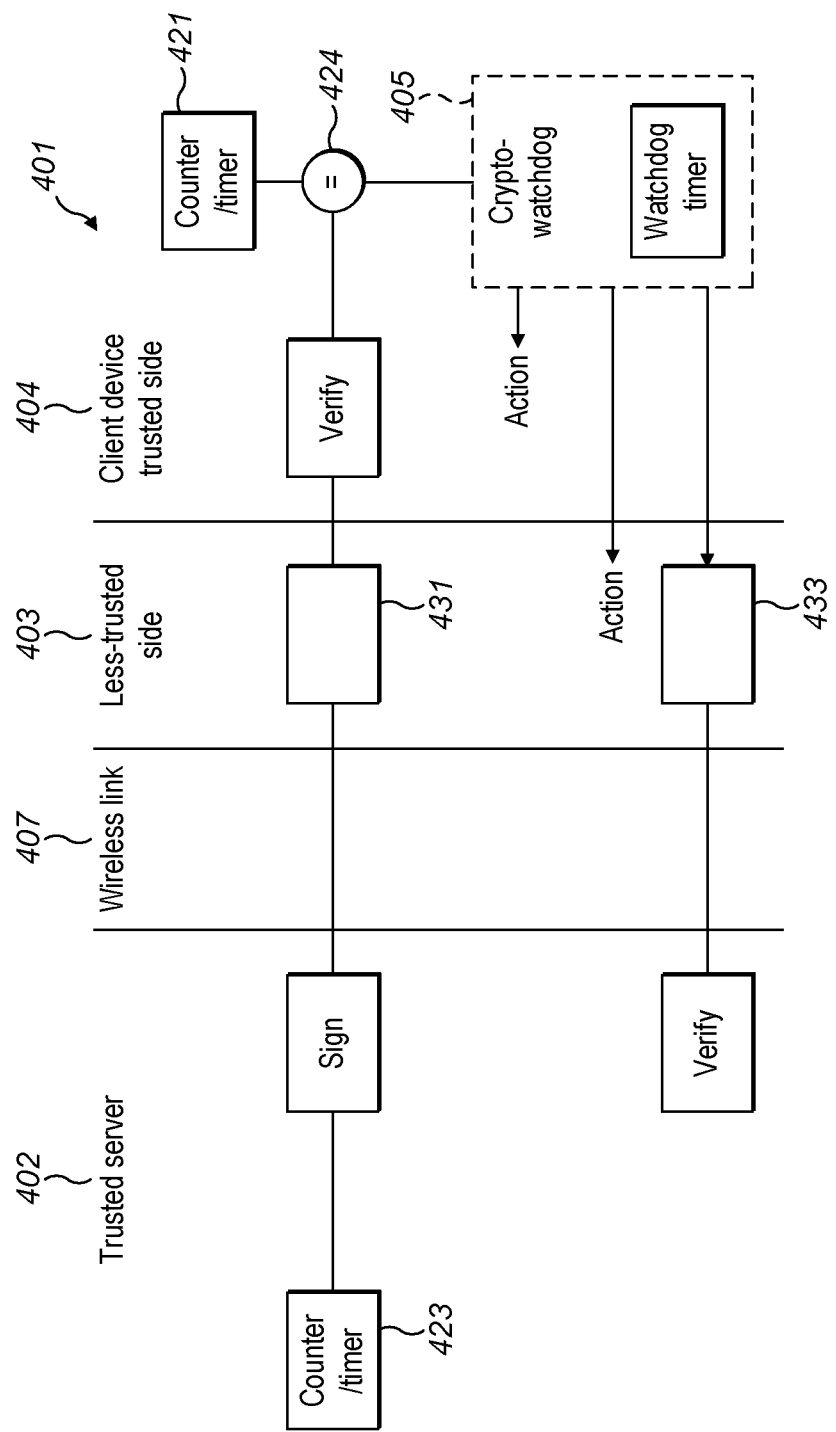
Figure 8A:
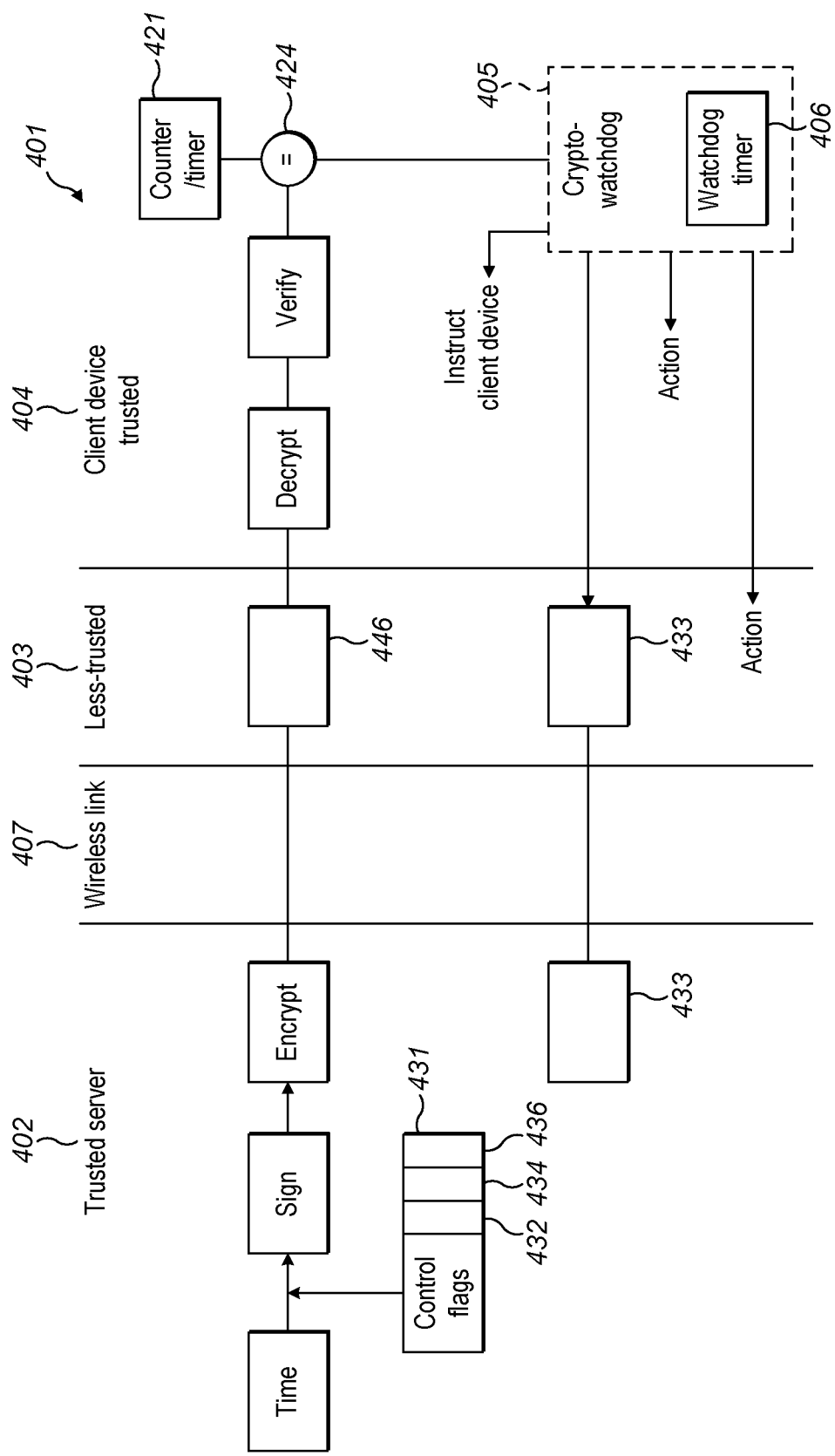
Figure 8B:
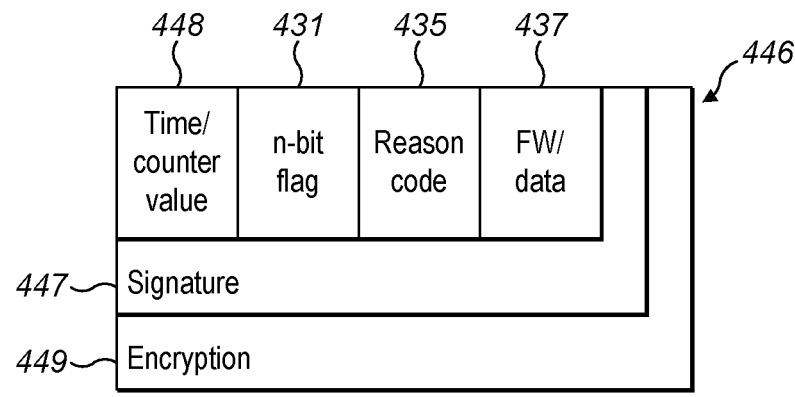
Figure 9:
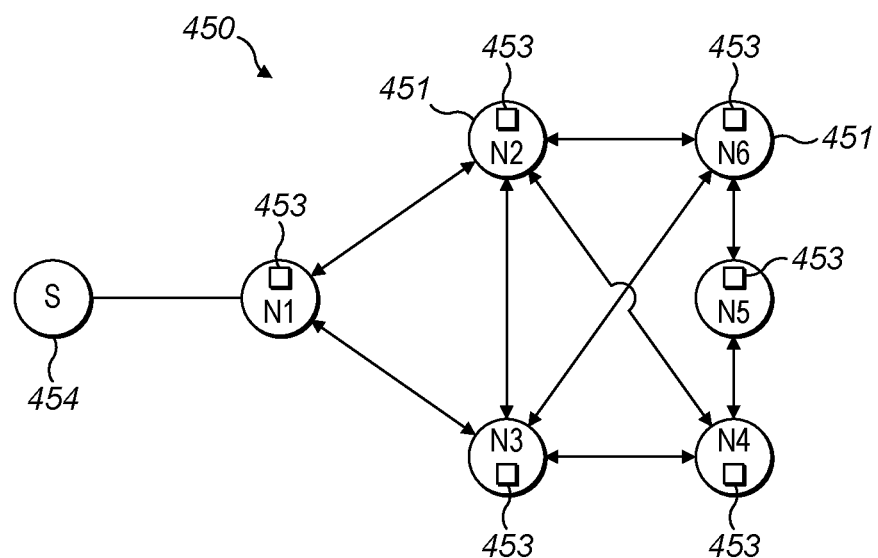
Figure 10:
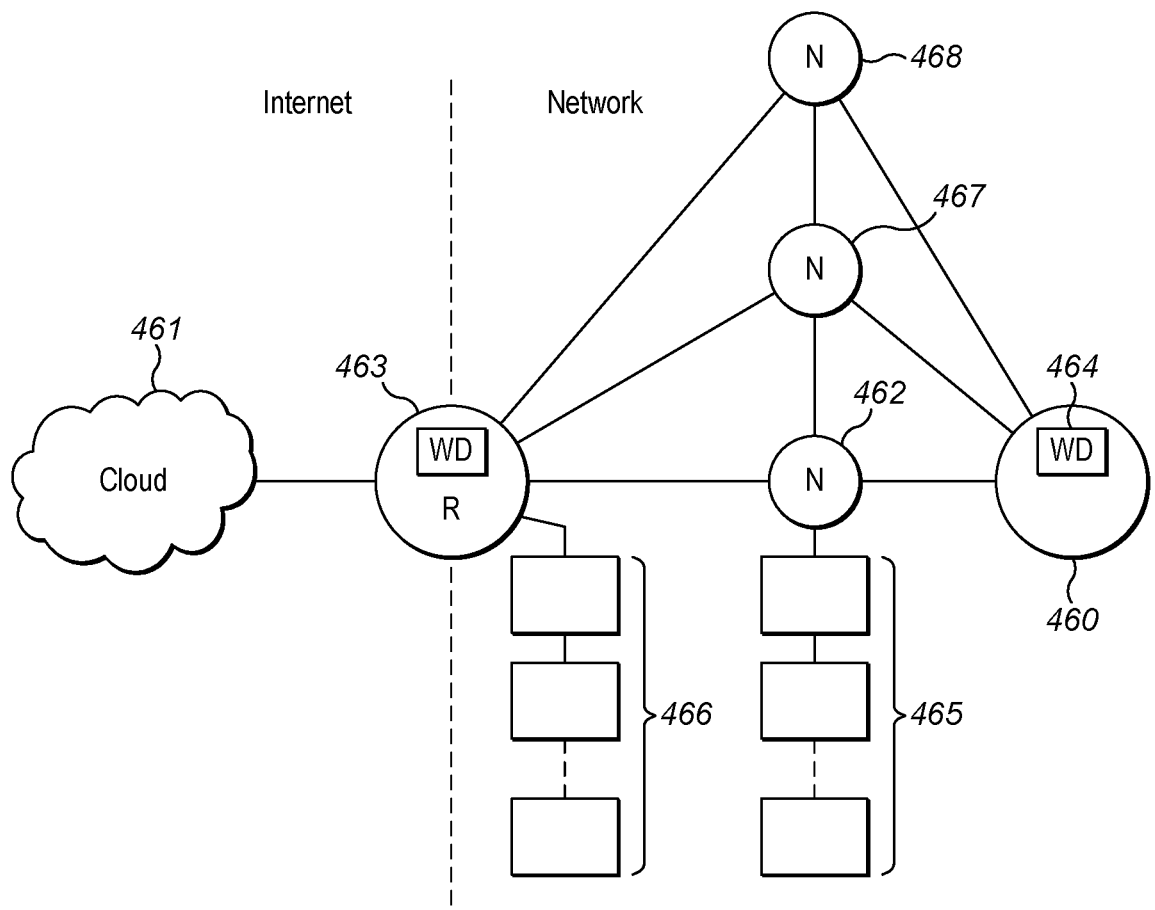
Figure 11:
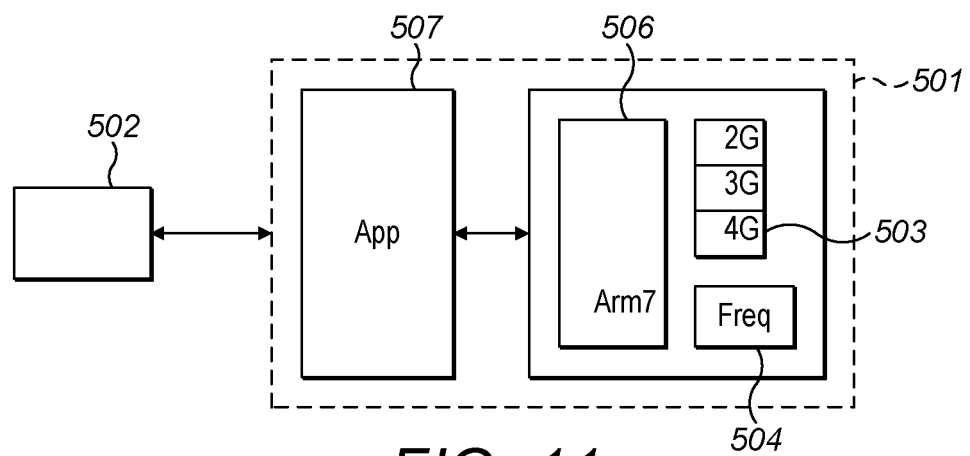
Figure 12A:
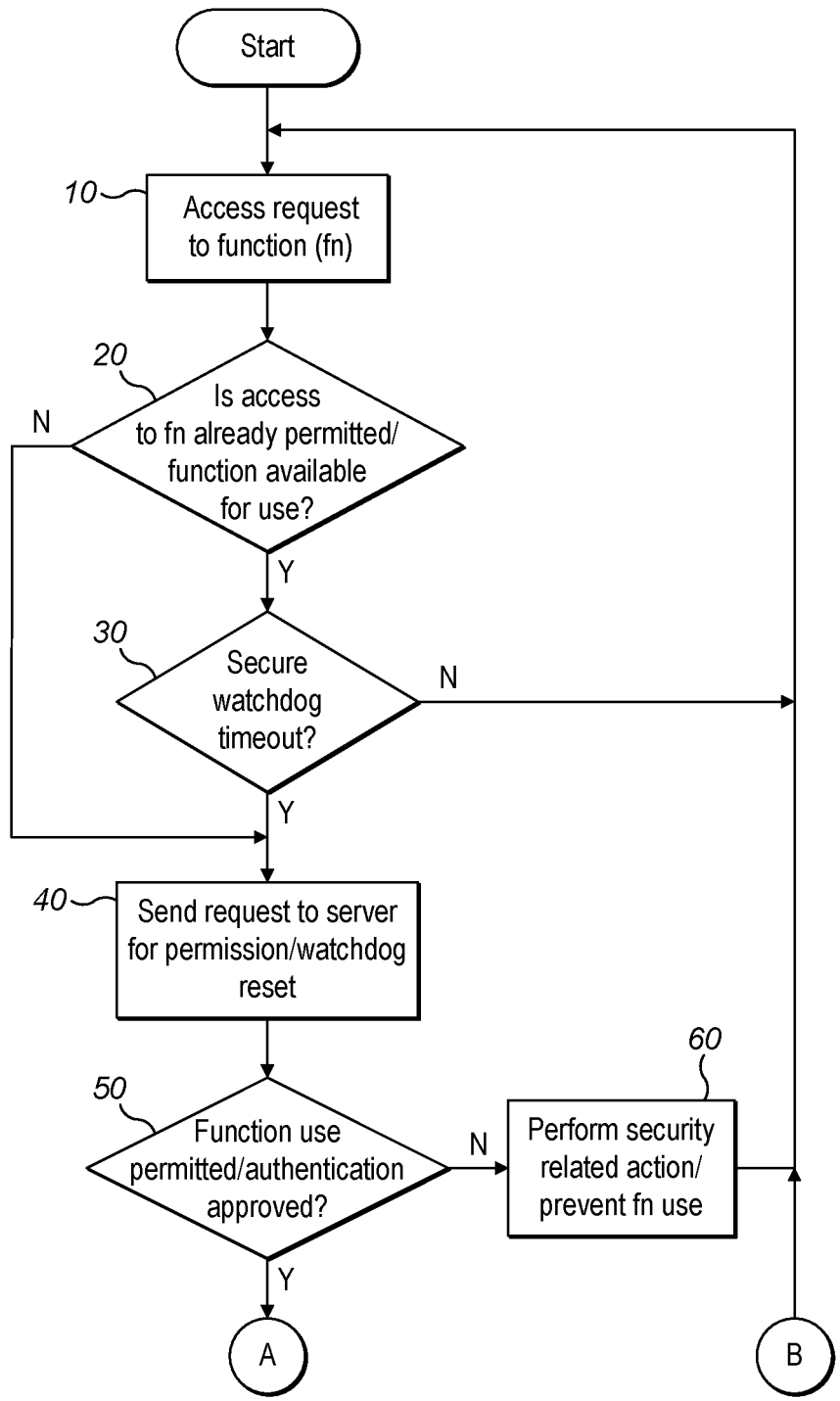
Figure 12B:
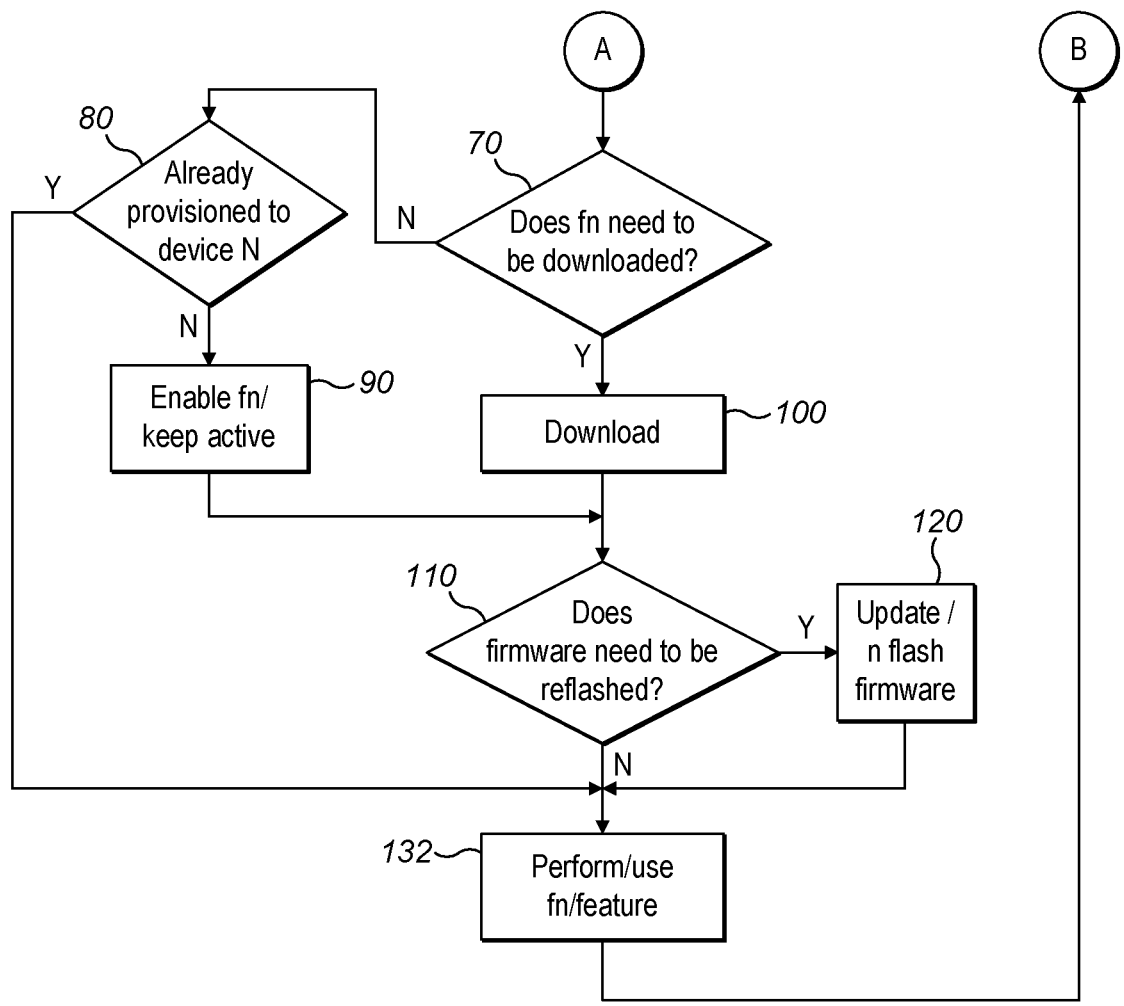
Figure 13A:
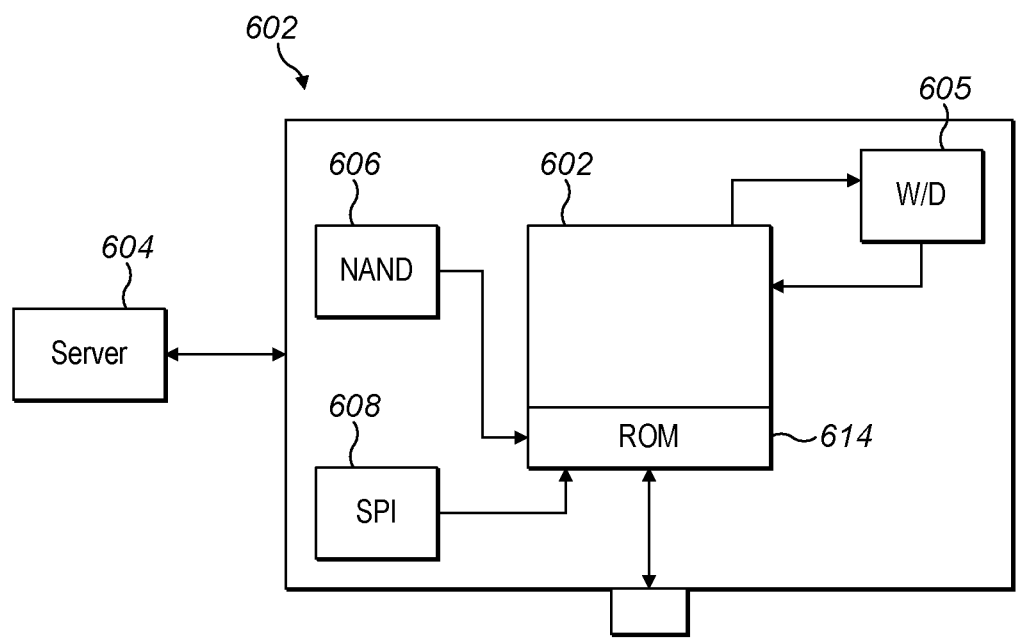
Figure 13B:
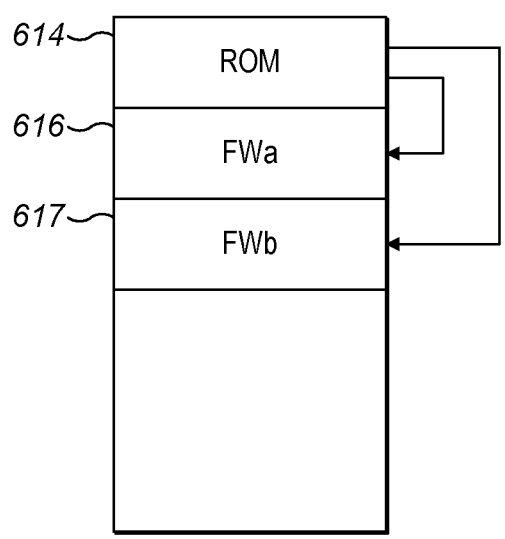
Figure 14:
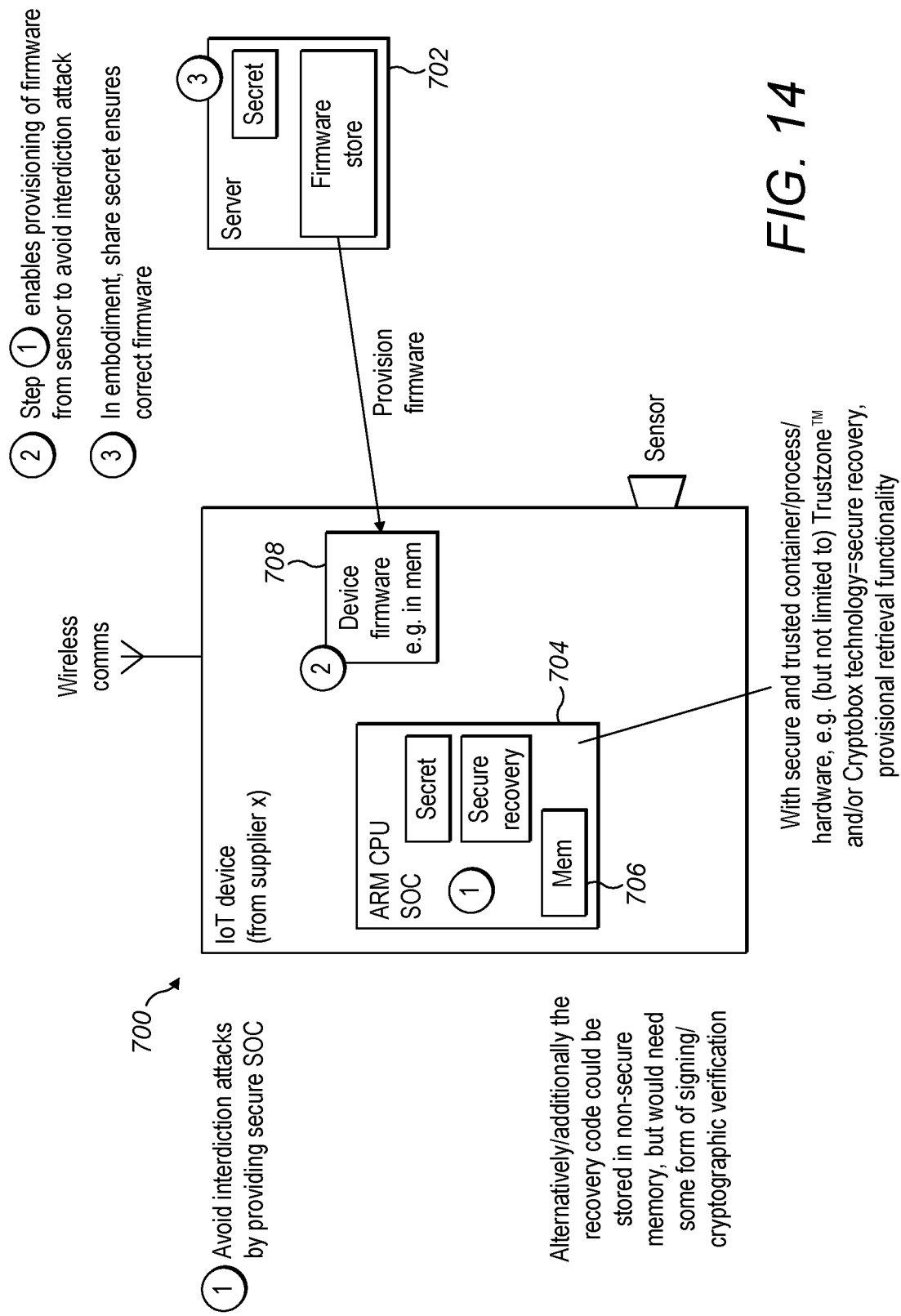

FIG. 3 schematically shows the data processing device of FIG. 2a according to an embodiment;

FIG. 4 schematically shows a communication between a data processing device and a server according to an embodiment;

FIG. 5a schematically shows a data communication according to an embodiment;

FIG. 5b schematically shows a secure remote flash update of the data processing device of FIG. 2a;

FIG. 6 schematically shows a challenge-response mechanism between a first device and a second device according to an embodiment;

FIG. 7a schematically shows a challenge-response communication between the first device and second device of FIG. 6 according to an embodiment;

FIG. 7b schematically shows a challenge-response communication between the first device and second device of FIG. 6 according to an embodiment;

FIG. 7c schematically shows a challenge-response communication between the first device and second device of FIG. 6 according to an embodiment;

FIG. 8a schematically shows a challenge-response communication between the first device and second device of FIG. 6 according to an embodiment;

FIG. 8b schematically shows a data communication according to an embodiment;

FIG. 9 schematically shows a communication between a server and nodes in a network according to an embodiment;

FIG. 10 schematically shows a communication between a client device and a web service according to an embodiment;

FIG. 11 schematically shows an illustrative example of a client device in communication with a server;

FIG. 12a illustrates one approach to using a client device having a crypto-watchdog according to an embodiment;

FIG. 12b further illustrates the approach of FIG. 12a;

FIG. 13a schematically shows an example of a client device according to an embodiment;

FIG. 13b schematically shows an example of memory according to an embodiment; and FIG. 14, schematically shows an IoT device in communication with a provisioning server according to an embodiment.

The description provided below and the accompanying drawings are intended to illustrate the functions of the present embodiments, and the sequence of steps for constructing and operating the present embodiments. It is not intended to represent the only forms in which the present example may be constructed or utilized. However, the same or equivalent functions and sequences may be accomplished by different examples.

IoT devices, for example IOT data processing devices, generally comprise software components which may reside in memory and which may be executed, such as stacks (e.g. WiFi, BLE), libraries (TCP, SSL, XML), APIs, databases, and/or device specific functionality software required to provide the different functionalities of the device, for example: sensor data receiving software, databases, security enabling software and the like.

As an illustrative example of an IOT device, FIG. 1a schematically shows a data processing device 1 comprising a general purpose operating element (not shown), whilst FIG. 1b schematically shows the operating state 21 of the general purpose processing element.

The data processing device is a client device 1, which may, for example, be a sensor operable to communicate with a server 2, via a wireless link 7 between antennas 3 and 5.

As will be appreciated by a person skilled in the art, the client device 1 may be configured to provide various functionalities such as sensing, communication (e.g. secure privacy enabled server communication), security (protection of server API tokens), cryptography and/or identification (unclonable device identity) and comprises software components within a shared environment in order to provide the different functionalities, whereby all components within the shared environment have the same privileges.

For example, software components such as the Bluetooth Low-energy (BLE) stack 4 and WiFi stack 6 provide communication capabilities such that the client device 1 can communicate with the server 2 via the wireless link 7 using a particular protocol (e.g. BLE, WiFi).

Furthermore, client device 1 comprises SSL Library 8 to provide a secure communication channel between client device 1 and server 2, whilst the crypto API 10, secure storage 12 and pseudo random number generator (PRNG) 13 provide cryptographic capabilities, for example to ensure that any data communication/message sent between the client device 1 and server 2 is undertaken using a cryptographic exchange, for example by symmetric or asymmetric key cryptography, the raw keys and/or secrets being stored in cryptokeys component 15 within the secure storage 12.

Furthermore, the client device comprises an unclonable device identity, provided by SecureID component 22.

Device firmware resides in device memory. Such firmware is generally pre-installed by a manufacturer of the client device 1, or updated by an engineer using a physical dongle, on deployment of the client device 1. A diagnose component 17 is provided to identify malware or an attack by an attacker.

The client device 1 comprises a shared environment, whereby, the software components operate on a common operating system with shared (completely or partially) address spaces.

Providing a plurality of components within a shared operating environment provides a large attack surface which makes it easier for an attacker (A) to break device security by compromising/breaking any one software component. A single vulnerability on a device may enable the compromise of an entire device and/or network, whereby, for example, successfully compromising one software component within the shared environment on a device, may also render the other software components within the shared environment more vulnerable to being compromised (as represented by common attack paths 26).

The large attack surface also makes it difficult to verify device security, whilst, in many applications it may be impractical to audit the security of all such components, in particular if such components can be modified by one or more vendors and/or users.

One approach that may be used to compromise a device is to disable, either temporarily or permanently, elements of communication with other devices. When such an attack is targeted at a client device for example, communication protocols of the client device may be modified by an attacker to prevent communication with another device, such as the server.

For example, by compromising a communications stack of the client device 1, for example the BLE stack 4 or WiFi stack 6, an attacker could prevent the client device 1 from communicating with the server 2, or an attacker could control the client device 1 to transmit malware to the server and/or to other devices in communication therewith.

Furthermore, an attacker might be able to attack the device firmware 14, such that attempts to reflash the client device 1 with desired firmware is prevented by the malware or the attacker. Therefore, it would be very difficult to recover from an attack as the device firmware 14 could be compromised by the attacker. Further it may even prove difficult for a user to know that their device has been compromised.

Furthermore, the client device 1 may be provided as part of a network comprising multiple embedded devices (e.g. a peer-to-peer mesh network), whereby the client device 1 is configured to communicate with the multiple embedded devices. It will be appreciated that if one of the embedded devices in a network is compromised by an attacker, the attacker may be able to use the compromised device to communicate with and compromise further devices, or to intercept data and decrypt communications transmitted between devices, for example, in a man-in-the-middle attack.

A shared environment also increases the possibility of an interdiction attack, whereby, for example, a piece of unwanted hardware is provided on the client device which will infect the client device while booting. In such a case, the end user would not be aware that malware was on the device and would unwittingly deploy the infected device, which may be used in an attack as described above.

Furthermore, an attacker may disable, either temporarily or permanently, elements of communication with other parties, in a denial-of-service attack.

In such a case, physical intervention by an engineer may be required to repair the compromised device, for example to reflash the device with the correct firmware, by, for example, inserting a portable flash drive (not shown) comprising the clean firmware into the device.

Such physical intervention would require the engineer to travel to the location of the device in order to access the port 16 to install the correct firmware, during which time the client device 1 may act inappropriately, or may be non-functional. Physical access is not practical in some cases, for example where the device is implanted in an animal or where the device is deployed in a hazardous area. Furthermore, the requirement for physical access impacts the scalability of devices and networks.

Various techniques to reduce the risk factors associated with shared environments are described below.

FIG. 2a schematically shows a hardware embodiment of a data processing device 50 for operating in accordance with at least some embodiments. FIG. 2b schematically shows the operating states of a processing element of data processing device; FIG. 2c schematically shows an illustrative example of libraries within different operating states of the processing element.

In the present embodiment, the data processing device 50 is an embedded device for use within a wireless sensor network (WSN) as part of an IoT application. Such a device 50 may be an ARM based system on chip (SoC) device from ARM Limited, Cambridge, England.

Device 50 comprises a processor core 52 for executing program instructions (for example application code, scheduling code, hypervisor code) and memory circuitry 54 (including both volatile (V) and non-volatile (NV) memory such as flash and ROM).

Memory protection circuitry 53 is provided to define access to the device memory (V) & (NV), and to different regions of the memory address space thereof.

The memory protection circuitry 53 may, for example, be responsive to protection configuration data 59, which is programmable by the processor core 52. The configuration data 59 specifies different regions of memory address space and associates different access permissions to be provided for the different software components. It will also be appreciated that in some embodiments the memory protection circuitry 53, may be part of the processor core 52.

Such memory protection circuitry 53 may comprise a memory protection unit (MPU) of the type designed by ARM Limited of Cambridge, England. The memory protection circuitry 53 may be arranged to provide access control to different regions of memory, whereby, for example, the different regions of the memory address space are accessible (e.g. to be read by and/or written to) only by authorised software components. In some embodiments this may alternatively be a memory management unit (MMU) which may further control physical to virtual address translation, as well as aspects of memory protection.

In the present embodiment, the processor comprises at least two operating states, e.g. a public(less-secure) state 71 and a private (secure) state 72, whereby software components may have different privileges depending on the operating state of the processor.

Software components such as code running on the data processing device 50 may be categorized as public/less-trusted code and private/trusted code respectively, the former of which may be used, for example, to execute general non-secure operations, (e.g. functions/sequences/applications) and the latter of which may be used, for example, to detect anomalies in the operations in the less secure state or to provide a protected environment not readily accessible by third parties. Secure components may include keys, crypto, secure watchdog (e.g. crypto-watchdog), timers, and aspects of firmware updates.

Access to software components categorized as trusted by software components categorized as less-trusted is managed, for example, using a defined API, thereby enabling managed (e.g., secure) access to the secure category of software components. Such categorisation of less-trusted and trusted code could be accomplished, for example via hardware (e.g., physically segregated memory) or software (e.g., virtually segregated memory spaces).

Furthermore, the software components may be divided into different software containers (e.g. independent software components) such that, for example, potential vulnerabilities on one software component (e.g. a library) cannot easily compromise other software components.

In some cases, the term "less-secure" and "private" are used in a manner similar to "less-trusted", whilst the terms "secure" and "private" are used in a manner similar to "trusted".

FIG. 2b schematically shows an example of public/less-secure states 71 and private/secure states 72 of the processor core 52 separated by a privacy boundary 73, whereby, certain resources (e.g. registers, interrupt priorities, hardware components) may only be accessible to certain software components i.e. some resources may then be inaccessible from other software components that do not require access to them, thereby providing one or more "trusted containers" each protecting one or more device resources. An effect of such functionality is to reduce the potential scope of a system/device compromise should one software component be compromised.

By way of example as shown in FIG. 2c, a cryptographic trusted container, for example library 78 within the private state 72 may be the only library (or one of a subset of libraries 80) that has access to raw cryptographic keys used to encrypt secure communications/transactions or any other form of operation that requires the use of a secure key. Therefore, application software 79 running within a public state may request access to the cryptographic keys (not shown), by, for example, calling a secure function. If the function call is allowable, then the processor may change state and the request is executed and the raw cryptographic keys may be accessed by the trusted library 78. If the function call is not allowable, then the request is denied (e.g., not executed) and the raw cryptographic keys are not accessed.

A further example of a trusted container is one that handles firmware updates for a device, controlling and managing firmware rollback and/or updates, both locally and remotely actioned, thereby making it more difficult for malware to become persistent.

It will be appreciated that the trusted containers should not be limited to those described herein and other variants are possible. Furthermore, a trusted container may comprise one or more functional elements and the examples provided herein should not limit the scope of functionality that one or more of these trusted containers may provide.

The device 50 further comprises communications circuitry 58, for example to provide communication capabilities e.g. via Bluetooth Low Energy (BLE), Near Field Communication, WiFi, ZigBee device, Bluetooth, Ethernet. Such communication circuitry allows the device 50 to communicate with devices remote therefrom, including, for example, gateways (e.g. routers), servers and/or other data processing devices, web services. It will be appreciated that any communications circuitry 58 is operable to comply with any required protocols and standards.

Communication device(s), for example an antenna 60, are provided on or within the device to enable the communication circuitry 58 to communicate with other devices via a wired or wireless link or both.

I/O 62 circuitry provides, for example, sensing/monitoring/actuating functionality. The I/O circuitry 62 may include for example, an accelerometer for sensing movement, a speaker for emitting a sound or a sensor for detecting a stimulus within an external environment (a heartbeat), a display for outputting messages to a user, a user input device (e.g. a button) for receiving instructions from a user.

It will be appreciated that the I/O circuitry may include or interface with other circuitry or hardware as necessary. For example, an analog-to-digital converter may be provided to convert an analog signal to a digital signal to feedback into the processor core 52 for use by an application.

The I/O circuity 62 may also include data ports (not shown), into which a memory storage device (not shown) may be inserted to transmit data to and/or receive data from the device 50.

The processor core 52 controls the operation of the devices and the circuitry within the device 50, for example, by using an operating system. Various forms of operating system (OS) may be used, for example ones specifically optimised for low power, specifically optimised for real time operation, and/or lightweight and targeted at IOT nodes to illustrate but a few.

FIG. 3 schematically shows data processing device 50, whereby device 50 comprises multiple hardware and software resources.

In the present example, the device 50 comprises public and private states which are separated by a privacy boundary 121.

Software containers (trusted containers) associated with a trusted region 106 of memory have rights of memory access that are not available to software containers (less-trusted containers) associated with a less-trusted region 104. It will be appreciated that the trusted and less-trusted containers may also have associated hardware resources as required to provide device functionality e.g. communications circuitry, I/O circuitry etc.

In the present embodiment, less-trusted containers include BLE stack 108 and WiFi stack 110 for providing communication capabilities between the device 50 and a remote device, for example server 102.

Further illustrative examples of less-trusted containers include application protocol 112 and SSL Library 114 to provide secure communications; device management container 116 to manage the interaction between the various resources and diagnose container 118 to identify any suspicious activity or anomalies within the device 50, for example by an attacker or malware compromising the device 50.

In the present embodiment, trusted containers include firmware update 120. The firmware update 120 securely handles firmware updates for the device 50, by, for example, controlling and managing firmware rollback and/or updates, both locally and remotely as herein described.

The trusted region 106 also comprises trusted containers which provide secure functionality for the device 50, such as the secure storage container 128, which comprises cryptokeys 130, wherein the raw cryptographic keys (e.g. a private key of the device) are stored.

In the present embodiment all raw cryptographic keys are stored within the cryptokeys 130 within the trusted region 106. The raw cryptographic keys may be provisioned by the manufacturer of the device, or may be provisioned by a trusted device (e.g. a server) at any time.

The cryptographic keys may be used to verify and decrypt communications received from the server 102 and/or sign and encrypt communications transmitted to the server 102 (e.g. using a suitable scheme such as, for example, symmetric or asymmetric encryption schemes).

An example of a suitable signing/verification algorithm is SHA256, MAC or HMAC, whilst a suitable encryption standard used to securely encrypt/decrypt communications using the raw cryptographic is AES-128, AES-256.

It will be appreciated that the strength of the signing/verification and encryption/decryption processes are dependent on the raw cryptographic keys (e.g. the device's private key) being kept secret from all unauthorised parties. For example, when a communication is signed and encrypted it is sent to a receiving party. On receiving the encrypted communication, the receiving party will use its cryptographic key(s), to decrypt the communication, and to verify the signature to confirm the origin of the communication.

Public code running on the less-trusted region may be authorised to access trusted containers, but only in certain circumstances, for example via a secure API e.g. the crypto API 122 or indirectly via another resource (as represented by arrow 131). However, any requests to directly access the raw cryptographic keys within the cryptokeys component 130 may be denied.

Advantageously, the provision of a less-trusted region 104 and trusted region 106 within the device 50 ensures that sensitive data (e.g. cryptographic keys, firmware updates) and system integrity is protected, whilst it is more difficult for an attacker to compromise trusted containers within the trusted region 106. For example, arrows 131 illustrate that less-trusted containers may only access resource trusted containers via an API (CryptoAPI 122). Furthermore, such a configuration protects key material and system integrity, for example using hardware memory protection, whereby an attacker may compromise the less-trusted region 104 without affecting the security of the trusted region 106.

It will also be appreciated that as well as cryptographic keys and firmware updates, other information relating to the secure running of the device may also be maintained within the trusted region 106.

FIG. 4 schematically shows a communication between a data processing device, which in the present example, is a client device 201 and a device remote therefrom, which in the present example, is a trusted application server 202.

The client device 201 is substantially similar to the client device 50 as described above, in that client device 201 of the present embodiment comprises less-trusted software components running on a less-trusted region 203 and trusted software components running on a trusted region 213.

It will be appreciated that the application server 202 may comprise encryption keys operable to sign/verify and encrypt/decrypt data communications, whereby the data communications include trusted payloads comprising commands, data and/or firmware.

In the present embodiment, the client device 201 is connected to the application server 202 via a user device 206. In this embodiment, the user device 206 is an untrusted mobile device, which is operable to communicate with the trusted application server 202 via infrastructure of a mobile operator (e.g. 3G cellular).

The user device 206 may be a smartphone, PDA, laptop, smart-watch or any suitable device capable of running applications and communicating with the client device 201.

In the present embodiment, an untrusted application 211 running on the client device 201 requests information, for example commands, data and/or firmware from an application running on a user device 206.

In the present embodiment the user device 206 does not have the information requested by the client device 201 stored locally thereon, but the application server 202, of which the user device 206 is aware, does have the requested information.

In the present embodiment, the client device 201 is connected to the user device 206 via a BLE link 210 between BLE circuitry 207 on the client device 201 and BLE circuitry 209 on the user device 206, whereby BLE stack is provided as public (less-trusted) code.

The user device 206, in turn, connects to application server 202 (e.g. using 3G cellular), whereby, in the present example, the application server 202 is located at a data centre 212 and configured to connect to wired internet 215 (e.g. via Ethernet).

A secure connection 208 is set up between the client device 201 and the application server 202, using any suitable protocol, for example using a cryptographic protocol such as Secure Socket Layer (SSL) or Transport Layer Security (TLS).

When the secure connection 208 is active, the application server 202 generates a data communication 205 which comprises the information requested by the client device 201.

In the present example, the data communication 205 is encrypted using the client device's public key, and signed using the server's private key, for example using AES-128 encryption, or any suitable encryption protocol, to form a trusted data communication 214, which is opaque (i.e. inaccessible) to parties which are not privy to the cryptographic key(s) required to decrypt/verify the data communication 214.

The data communication 214 is received at the client device 201 through the secure connection 208 via the wired internet 215, 3G internet 212, and BLE wireless link 210.

It will be appreciated that although the data communication 214 is received at client device 201, less-trusted code will not have access to the cryptographic keys required to decrypt the data communication 214 because the cryptographic keys are retained within the trusted region (not shown FIG. 4), and therefore the data communication 214 is also opaque to the less-trusted code and the application 211 which requested the information.

The data communication 214 is transferred to the trusted region 213, for example by an API call, whereby the data communication 214 is decrypted and verified using the cryptographic keys stored within the trusted region 213.

Once decrypted and verified, the decrypted data communication 219 is processed within the trusted region 213, and for example commands are executed, data processed and/or firmware used to reflash the less-trusted region 213 or stored for future use.

It will be appreciated that as neither the mobile operator, the user device 206 nor the untrusted application 211 have direct access to the cryptographic keys required for signing, verifying, encrypting or decrypting the data communication 214, the data communication 214 remains opaque and secure even if intercepted by a third party at any point along the secure connection 208. It will also be appreciated that client device 201 is protected against various types of attacks on both the data communication 214 or on the secure connection 208, such as replay-attacks and/or man-in-the-middle attacks Furthermore, the provision of a less-trusted region and a trusted region on the client device 201, provides for secure end-to-end communication between the client device 201 and another device, for example, an application server.

Various hardware and/or software components may be implemented to transmit and receive data communications across the various devices and networks, to ensure that the data communications are sent to and received by the correct destination. It will also be understood that various protocols may be observed between each stage of transmission.

For example the wired internet 214 may use Datagram Transport Layer Security (DTLS) to provide communications privacy, Universal/User Datagram Protocol (UDP) for message transfer, IPv6 to route traffic across the internet whilst IEEE 802.3 Link Layer provides a data communications network standard.

Similarly, DTLS, UDP, IPv6 and 3G LL may be used for the 3G wireless internet for communications between the 3G network provider and the 3G interface on a 3G enabled device.

Furthermore, BLE may use generic access profile (GAP) to control connections and advertising in Bluetooth, generic attribute profile (GATT) to define the way BLE devices transfer data back and forth, whilst the attribute profile (AP) and BLE Link Layer provide further functionality in the communication between devices.

It will be appreciated that methods of communication between devices is not limited to wired internet, 3G and BLE, nor are the protocols and standards limited to those described herein. For example, 4G cellular could be used as an alternative to 3G cellular, whilst WiFi, Bluetooth, NFC, ZigBee or any suitable communications method could be used as an alternative to BLE.

In the present embodiment, the communication stacks (e.g. BLE, WiFi) and SSL library run on the less-trusted region 203 of the client device 201, such that the trusted region 213 is communication protocol agnostic.

Therefore, it will be appreciated that there is no requirement to integrate the communication software components into the trusted region 213, and all such communication software components run on the less-trusted region. Furthermore, there is no requirement to permit code running on the less-trusted region to directly access trusted software components, as all interactions therebetween can be controlled by a trusted API running on the trusted region.

Therefore, the attack surface of the trusted region 213 can be minimised, thereby reducing the likelihood of the trusted region 213 being compromised.

The description above describes secure end-to-end communication from an application server to a client device, whereby opaque signed and encrypted payloads are forward from the less-trusted region to the trusted region. However, it will be appreciated that the same techniques are also applicable to communications sent from the client device 201 to the application server, whereby a communication generated by trusted code is signed and encrypted using cryptographic keys within the cryptokeys component and is passed from the trusted region 213 to the less-trusted region 203 for transmission to the application server 202. It will also be appreciated that communications may be sent and received to/from other data processing devices and the functionality is not limited to communications with a server.

FIG. 5a schematically shows a data communication 214 according to an embodiment. The structure of the data communication 214 is represented as a communications frame having individual blocks including:
 a connection ID header 241 describing the parameters of the frame;
 Protocol ID 242 providing compliance with any required protocols, packet size block 243 describing the size of the transmitted data communication 214;
 trusted payload block 244 which comprises the transmitted data/firmware snippets or parts/commands;
 sequence counter 245, which may contain the value of a counter, e.g. which advances incrementally each time a data communication is sent, for example to ensure that multiple communications in a chain are received correctly;
 ECDSA (SHA-3(msg)) block 246, which describes a cryptographic protocol for the data communication 214; and
 size padding block 247, for example to provide padding to the data communication as required e.g. by a security protocol.

Furthermore, in the present embodiment, the data communication 214 is encrypted using AES-128 encryption 248, but any suitable method may be used.

Any suitable communications frame could be used for secure end-to-end communications between remote devices.

FIG. 5b schematically shows a secure remote flash update of the data processing device 201. In the present embodiment, the firmware is transmitted from a remote apparatus e.g. an application server (not shown in FIG. 5b), within the signed and encrypted data communication 214 via secure communication channel 208 as described previously.

As described previously, on receipt of the data communication 214 at the less-trusted region 203, the data communication 214 is passed to the trusted region 213, for example using a secure API.

The data communication 214 is decrypted and verified in the trusted region to provide decrypted communication 219 containing firmware block 230 (e.g. firmware update snippet) as shown as "FW005". The firmware block 230 is stored within secure memory within the trusted region 213 along with other firmware blocks 230. It will be appreciated that such functionality supports partial firmware updates, whereby the firmware block 230 is sent from the application server within a trusted data communication 214.

The client device 201 may then undertake checks to verify that all firmware blocks 230 are received. For example, a verification checksum may be used. Furthermore, an incremental hash may be maintained for all firmware updates.

Once all required firmware blocks 230 are received, the less-trusted region 203, or a portion thereof, may be reflashed using the firmware in the secure memory/storage of FIG. 5b. Code/firmware in the trusted region 213 may also be updated/reflashed using the same mechanism. A reflash may occur on verification that all firmware blocks 230 are successfully received, on receipt of an instruction from a remote device. As such firmware over the air (FOTA) updates are provided in a secure manner In this way the client device 201 may be remotely provisioned or remotely reflashed by a remote device. In this way downgrade attacks may be prevented.

Therefore, as both the less-trusted region 203 and trusted region 213 of the client device 201 may be reflashed on receiving a data communication from a remote device, physical access by a technician or user/owner intervention is not required.

Furthermore, whilst firmware may be provided on the client device at manufacture, the integrity of the firmware may be verified before provisioning/reflashing occurs after deployment, for example by cryptographic signing and/or cryptographic verification. Therefore, it will be appreciated that the firmware could be held within the less-trusted region and verified before being used.

It will also be appreciated that the client device 201 may be provisioned with firmware by the remote device/apparatus on deployment of the device. Therefore, it will be appreciated that firmware rollout can be safely separated from firmware authors, whereby provisioning of the firmware to the device can be safely outsourced to and managed by security service providers (e.g. the trusted server). Further separate firmware elements held in the less secure memory/region and secure memory region means that application specific elements may be managed, controlled and updated independently of security/cryptographic elements held and operating in different security levels.

In an illustrative embodiment, a further example of a trusted container may be a cryptographic envoy that may be used to protect security keys and/or may be used to verify hardware identity. This cryptographic envoy may be implemented in software or hardware and may operate on a data processing device (although it may also run on other devices) and may incorporate a cryptographic watchdog, herein referred to as a "crypto-watchdog".

This crypto-watchdog may be used to monitor for, or for lack of, security related events. Further details are set out in the description and figures herein. The crypto-watchdog may be provided in a secure element of a system on chip (SoC), as dedicated hardware or software, using a general purpose processor dedicated to such operations and/or function within a secure operating state on a general purpose processing element, for example operating within the Trust-Zone® secure operating state on a processor from ARM Ltd, UK.

FIG. 6 schematically shows a challenge-response mechanism between a data processing device 401 having a crypto-watchdog 405 associated therewith and a second device 402 remote from the data processing device, whilst FIGS. 7a-7c each schematically show illustrative examples of challenge-response communications between the data processing device 401 and second device 402.

In the present embodiment, the data processing device 401 is a client device 401 (e.g. an IoT device), which is capable of performing one or more operations, whilst the second device is a trusted server 402.

In the present embodiment, the client device 401 comprises a less-trusted region of memory 403 and a trusted region of memory 404 as previously described above. In some embodiments, secure operations can be performed within a trusted region, and further operations can be performed within the less-trusted region as previously described whereby operations may execute within the trusted region to detect anomalies on the less-trusted region. In some embodiments, the crypto-watchdog 405 may be provided to detect and recover from anomalies in one or more operations.

In some embodiments, such operations may comprise code functions/sequences of code or may be full applications for example. Such anomalies that may be detectable may comprise, but are not limited to, intrusion activities in which a third party may attempt to modify, change, upload, or 'hack' code/software/firmware capable of executing on the apparatus, and/or coding errors, and or malfunctions within applications.

Furthermore, the response operation may comprise a recovery operation in which, for example, further operations may be executed, the one or more operations may be overwritten or refreshed, one or more of the one or more operations may be disabled, a device reset is initiated and/or an exception event is generated.

The crypto-watchdog 405 generally comprises a watchdog timer 406 (not shown in FIG. 6) which, for example, counts to a specific value (e.g. using a clock), and, on reaching the value a timeout occurs, whereby the watchdog timer initiates a response operation.

In the present embodiment, during normal functioning of the client device (e.g. when no anomalies are detected), a code or signal is periodically generated within the trusted region 404 of the client device which is used to reset the watchdog timer 406, whereby, for example, in some embodiments, the code may write a known value to a register associated with the crypto-watchdog 405 which resets the watchdog timer 406. However, if an anomaly in one or more operations on the client device 401 is detected, the client device 401 may be unable to generate the code, thereby resulting in a timeout.

In some embodiments the client device 401 may communicate with another device remote therefrom, e.g. the server 402, and compare received data with data stored or generated locally within the client device 401 in order to perform the anomaly detection. This may comprise, for example, comparing a shared secret and/or generating a cryptographic hash. In other words, the client device may not self-check its operation and may rely on data from the server; a comparison to server stored or generated data; or a lack of response from a server to detect an unexpected event/anomaly.

The crypto-watchdog 405 may be used, within a challenge-response mechanism enabling anomaly detection and verification between the client device 401 and server 402.

It will be appreciated that the functionality is not limited to communications between client devices and servers and could be used when communicating between any suitable devices such as gateways or other intermediaries, within which secure verification may be required. It will also be appreciated that the client device 401 and server 402 may be located on different networks and/or in different countries (e.g. the client device 401 may be in a user's home in the United Kingdom, whilst the server 402 may be located in the United States of America). The client device 401 and server 402 may communicate using secure end-to-end communications as previously described.

In the present embodiment, the crypto-watchdog 405 comprises a watchdog timer 406, which is operable to countdown using any suitable time period dependent on the specific application of the device, for example in the range of milliseconds, seconds, minute(s), hours or days etc. It will also be appreciated counting down using a time reference is only one possibility, and any suitable method to implement the watchdog timer may be used.

In some illustrative embodiments, on timeout of the watchdog timer, the crypto-watchdog 405 may initiate a response operation (e.g. via an API), such as a security related action, which may comprise, but is not limited to, initiating a reset of the processor or an application, initiating a re-flash of the device firmware, requesting a firmware download from the server or from another device, performing a status check of the client device, disabling one or more functional elements and/or reporting an error to a user and/or server if communication is still possible and/or switching a boot source.

Further security related actions may include the client device 401 waiting for repeated failed communication attempts and/or gradually reducing functionality or stop working and providing further information to the server 402, or another device and/or booting to a secure recovery mode.

The secure recovery mode may provide a secure mode of operation, for example, whereby the secure recovery mode provides limited functionality in comparison to a general operating mode, whereby only selected resources are enabled, for example, to enable communication with the server 402 to allow the client device 401 to continue to identify anomalies within operations, to send data to the sever 402 and/or to receive data necessary to verify security/communications.

The secure recovery mode may also be used to initiate checks and/or provide capabilities to request and/or receive additional code/firmware updates. If communication with a server 402 is still not possible within the secure recovery mode, it may be illustrative of other functional problems, such as failed communication hardware (for example wireless interface hardware) or infrastructure and thus the secure recovery mode code may determine that the likelihood of any malicious activity on the client device 401 is low.

Such a secure recovery mode may also be useful for recovering from a failure or problematic firmware updates as the client device 401 may automatically initiate secure recovery mode if anomalies are detected, thereby enabling a re-programming of the problematic firmware. Further, such a request may also be initiated by the server 402 when the server 402 becomes aware of problems or risks within the client device 401. Furthermore still, the client device 401 may be forced into a secure recovery mode by the server 402 to force a firmware update.

The recovery mode may enable the client device 401 to be provided with only secure, limited operating capabilities which are preloaded into the secure state, and then on roll-out of the apparatus, the apparatus may be able to provision itself and download firmware specific for that device from a remote device e.g. a trusted server, whereby the firmware enables the client device to operate and execute applications as required by a user.

In an illustrative embodiment, the crypto-watchdog 405 may require a verifiable communication from the trusted server 402 in order to reset the watchdog timer 406. In the present embodiment, the crypto-watchdog 405 is operable to generate a challenge communication 408 comprising authentication data, for example a cryptographic nonce, whereby the nonce is generated within the trusted region, for example, using a pseudorandom-number generator (not shown).

The challenge communication 408 is passed to the less-trusted region 403 and transmitted (W) to the server 402, for example over a wireless link using BLE or any suitable communications means including, but not limited to, WiFi, ZigBee, 3G, 4G.

In response to receiving the challenge communication 408, the server 402, signs the cryptographic nonce 408 with further authentication data or a verifiable identifier, which in the present illustrative example is a shared secret. It will be appreciated that the shared secret may comprise a cryptographic element such as a shared cryptographic key. However, in some embodiments the shared secret may also comprise related keys, whereby a party having one key is able to verify data signed with a different key, even if the cryptographic keys are not themselves identical.

In the present embodiment, the shared secret is a public/private key pair whereby the server's 402 public key will be known to the client device 401 (e.g. provisioned on manufacture) such that if the server 402 signs the nonce, for example, with its private key, the client device 401 can verify that the signed nonce originated from the server 402.

The server 402 then transmits the signed nonce to the client device 401 (X), whereby it is passed to the trusted region 404, e.g. using a secure API call, and is verified, and the nonce 418 received from the server 402 is compared to the nonce which was sent to the server 402.

If the signature and the nonce received from the server 402 are both confirmed as matching the nonce generated by the crypto-watchdog 405, then the crypto-watchdog 405 resets the watchdog timer 406 before timeout.

In the event that no response is received from the server 402, or if the received response is incorrect, for example if verification of the data communication fails, or if the received nonce does not match that previously generated by the crypto-watchdog 405, then the watchdog timer 406 is not reset and a timeout will occur.

In a further illustrative example, the crypto-watchdog 405 may issue a further challenge before timeout, to verify whether the verification failure was a one-time error by the server 402.

In the present embodiment, generation of the cryptographic nonce and comparing the nonce to the nonce 418 received from the server 402 is performed by the crypto-watchdog 405. However, it will be appreciated that either operation could be readily performed by operations running on the trusted region e.g. via a secure API.

It will be appreciated in the present embodiment the crypto-watchdog 405 initiates a challenge and awaits a cryptographically correct response with further verification by response of the correct shared secret from the server 402 in order to reset the watchdog timer 406. If the data communication is not verified as originating from the server 402, or if it is determined that the data communication is tampered with (e.g. the nonces do not match), then the watchdog timer 406 may not be reset and a timeout would occur.

The approach of providing a data processing device incorporating a watchdog component which relies on receiving verifiable authentication data from a device/apparatus remote therefrom to maintain functionality provides for improved secure operation of the data processing device. If communication between the data processing device and remote device/apparatus is lost, for example due to a denial-of-service attack, a communications error or malicious code which prevents communication, then the watchdog timer will not reset (and a timeout will occur). On timeout, the client device 401 may perform a security related action as previously described.

Furthermore, as the cryptographic nonce is generated by a resource within the trusted region and subsequently passed to the less-trusted region, any anomaly within the cryptographic nonce or the received nonce may indicate tampering of the communication, for example by code running on the untrusted region, a third party or malware. An anomaly may result in a timeout as the tampered nonce will not match the generated nonce.

In a further illustrative example as described in FIG. 6 and FIG. 7b, the server 402 is operable to securely identify the client device 401, whereby the server generates a challenge communication 419, for example a cryptographic nonce 419, and optionally signs the nonce, and transmits (Y) the nonce 419 to the client device 401.

The nonce 419 is passed to the trusted region 404, verified if signed, and passed to the crypto-watchdog 405.

The nonce 419 is signed using a cryptographic key of the client device 401 (e.g. private key) (as shown in FIG. 6) and the signed nonce 429 is passed to the less-trusted region 403 and transmitted (Z) to the server 402.

The server 402 comprises a cryptographic key (e.g. the client device public key) to verify the signature of the client device 401. The nonce received from the client device 402 is then compared to the generated nonce. If the server 402 is unable to verify the client device's signature or if the nonce returned from the client device 401 does not match that generated by the server 402, or if the server 402 does not receive a communication from the client device 401, then such functionality is indicative of an anomaly in the operation of the client device 401, whereby, for example, code running on the less-trusted region the client device 401 may be compromised by an attacker/malware. In such circumstances, the server 402 can take a security related action, e.g. it can withhold communicating with the client device 401, whereby the watchdog timer will timeout or it can provide instructions/commands to the crypto-watchdog 405 to undertake an action as described below.

The server 402 may generate a nonce 419 periodically as a challenge to the client device 401 to verify that the client device 401 is functioning correctly, and to verify that the client device 401 is that which it purports to be, and may do so in parallel with the client device 401 undertaking the challenge-response mechanism as described above in FIG. 7a.

Such an approach also enables secure communication between the client device 401 and server 402 across multiple devices as described above. Such an approach is protocol agnostic and allows the use of different protocols and communication stacks that may run on the less-trusted region 403.

The approach of providing an embedded device 401 with a crypto-watchdog 405 within the trusted region which is independent of any communications protocol requirements, allows the use of different protocols and communication stacks that may run on the less-trusted region 403, and, therefore, reduces the attack surface within the trusted region.

FIG. 7c schematically illustrates an example of a challenge-response communication between the client device 401 and server 402 according to a further illustrative embodiment. Like numbering will be used for like features as described above.

In the present embodiment, the client device 401 comprises a timer 421 within the trusted region 404 whilst the server 402 comprises a timer 423, whereby the timers 421/423 generate a synchronised common time value (for example a UNIX time value). The client device 401 also comprises a comparator 424 for comparing the time values. In the present embodiment the comparator 424 is provided within the trusted region 404. Both the timer 421 and comparator 424 may be implemented using hardware and/or software.

In the present illustrative example, the server 402, signs a data communication 431 comprising a time value generated by timer 423 with a shared secret as previously described (e.g. using the server's private key).

The server 404 then transmits the data communication 431 to the client device 401. The data communication 431 is passed to the trusted region 404 and verified, and the time value received from the server 402 is compared, e.g. by comparator 424, to a time value generated by timer 421. As the time values of timers 421 and 423 are synchronised, the time value within the data communication 431 from the server 402 should match the time value generated by timer 421. (Matching includes being within an allowable time window to take account of any delays/latency in the communication between server and client device).

If the time value within the data communication 431 received from the server 402 is confirmed as matching the time value generated by timer 421, then the crypto-watchdog 405 is configured to reset the watchdog timer 406.

In the event that no communication is received by the client device 401, or, for example if verification of the data communication fails, or if the received time values do not match (e.g. the time value received from the server is outside the allowable time window), then the crypto-watchdog 405 does not reset the watchdog timer 406 and a timeout results. On timeout, the client device 401 may perform a security related action as previously described.

Such functionality provides the challenge-response functionality similar to that as described above in FIG. 7a, but without the client device 401 having to actively issue a challenge, whereby the server 402 generates the communication comprising the time value periodically as required to prevent timeout (e.g. every second, minute, hour, day etc.).

In a further illustrative embodiment, the timers 421 and 423 may be replaced with counters, which generate counter values e.g. sequential counter values, whereby the counters in the respective devices are synchronised.

As described above, the server 402 may send signed and optionally encrypted data communications comprising counter values generated by counter 423 to the client device 401, whereby, the data communication from the server 402 is verified.

A counter value comparator (e.g. a hardware or software component) may be provided within the trusted region 404 of the client device 401 to compare counter values communicated from the server 402 and those generated locally on the client device 401, and if the counter values of the respective devices match (e.g. within a threshold window), then the crypto-watchdog 405 is operable to reset the watchdog timer 406, whilst if the counter values do not match (e.g. outside a threshold window), then the crypto-watchdog 405 will not reset the watchdog timer 406. On timeout, the client device 401 may perform a security related action as previously described.

In an illustrative embodiment, cryptographic hashes may be used to verify the integrity of the firmware/software components of the less-trusted region, by triggering a request to the server together with a shared secret.

In an illustrative example, the crypto-watchdog 405 may be configured to generate a status update 433, and communicate the status update 433 to the server 402, e.g. as part of a challenge communication comprising the cryptographic nonce as described previously (FIGS. 6, 7a and 7b), or as a discrete communication, whereby the status update 433 comprises information relating to the integrity of one or more operations, and/or firmware/software/hardware components on the device. Therefore, on receiving the status update the server 402 may verify that the status update was transmitted by the client device 401 (e.g. by verifying a signature) and identify an anomaly on the client device 401 and take an appropriate action.

For example, the status update 433 may comprise summary data relating to the integrity of the one or more operations, and/or firmware/software/hardware components on the device, whereby any variation in the summary data from the expected summary data will be indicative of an anomaly within the operation/firmware/software/hardware to which the summary data relates. Any anomalies may be as a result of, for example, intrusion activities in which a third party may attempt to modify, change, upload, or 'hack' code/software/firmware.

The summary data may comprise, for example, the hash of the firmware thereby enabling the server 402 to identify changes to the firmware. An incorrect hash would then be indicative of an anomaly.

Other metrics relating to device functionality which may be provided as summary data, and therefore further examples of anomalies that may be detected, include, but are not limited to: power consumption patterns, communication density, packet sizes, packet types and main direction of communication (for example if a device starts initiating multiple connections vs. answering to incoming requests), source/type of communication (shift from border router to some unrelated device), statistical sampling of program counter (PC, instruction pointer), type and density of trusted APIs called, invalid signatures detected, tamper detection sensors on housing/board/System on Chip level (light, capacitive, inductive). Such metrics can be used by the server to determine the likelihood of the client device being compromised, and/or may indicate that the client device requires new firmware to provide certain functionality, whereby the server can provide the necessary firmware using FOTA using secure end-to-end communications as described above. The above metrics are for illustrative purposes only, and any suitable metrics could be used to provide a status update to the server 402 on the overall functionality of the device.

Furthermore, the status update 433 may comprise any suitable information e.g. code or n-bit flag values, whereby the flag values may have a specific meaning which will indicate a specific issue to the server 402, (e.g. a 2-bit flag value having a value of 1 indicates that no anomalies in the operations are detected, whereas a flag value of 0 may indicate that an anomaly in one or more operations is detected), whereby the flag values may provide specific information on any aspect of device operation.

Furthermore, on notifying the server 402 of an issue, the server 402 may be configured to perform a security action, such as for example, terminating communications with the client device 401, thereby resulting in the timeout of the watchdog timer 405.

Furthermore, as the communication comprising the status update comprises information relating to device integrity, the communication may be signed and encrypted within the trusted region, e.g. by the crypto-watchdog 405, using appropriate methods. Therefore, the communication will be opaque to any code applications running on the public region which may be compromised, whilst the server can decrypt the communication and determine the status of the client device, and/or verify the status update 433 originated at the client device. The server may expect a status update from the client device periodically, and, if it does not receive the status update 433, the server may be configured to perform a security action as described above.

In a further illustrative embodiment, on detecting an anomaly in one or more operations on the client device, the crypto-watchdog 405 may initiate a response operation, such as a security related action or a recovery operation as previously described above.

In a further embodiment, instructions/commands from the server 402 may be included in communications between the server 402 and the client device 401, for example by incorporating specific instructions into communications sent from the server 402 to the client device 401, whereby, for example, the instructions may be specific to an application or an apparatus or to the functionality of the processing element.

FIG. 8a schematically shows a challenge-response communication between the client device 401 and server 402 according to an embodiment, whereby application/device specific instructions/commands are included within the communications transmitted between the server 402 and the client device 401. Like numbering will be used for like features as previously described.

In the present illustrative example, the instructions/commands are provided as control flags 431. However, any suitable instructions/commands may be used (e.g. software code, reason code). In the present embodiment the trusted server 402 is configured to generate individual control flags 432, 434, 436.

The control flags may comprise n-bits, with the value of each control flag denoting a specific meaning/function for the operation of the client device 401. As an illustrative example, flag 432 may have a 1-bit value, whereby a value of binary 1 for control flag 432 denotes that the crypto-watchdog 405 should not reset the watchdog timer 406 and should instead reset the client device 401 immediately, whereas a value of binary zero 0 for control flag 432 denotes that the crypto-watchdog 405 should reset the watchdog timer 406 if the time/counter value is within the expected window or if the nonce matches that generated by the crypto-watchdog as described above.

In the present illustrative example, the server 402, generates a communication 446 comprising a time value generated by timer 423 and which further comprises control flags 431.

The communication 446 also includes further information for instructing the crypto-watchdog 405, for example, software code to indicate the reason for resetting the device. The communication may also comprise a data payload, for example firmware snippets, security rules and/or virus detection patterns for detection of anomalies in the operation of the device.

It will be appreciated that the communication 446 comprising the control flags 431 and/or software code and/or data payload may define further functionality for the client device 401, such as, for example, defining which features of the client device to unlock, which resources to disable/enable, which security related action to undertake, which specific memory location to reflash, which boot source to boot from, and/or instructions defining the timeout period of the watchdog timer. For example, the server may indicate when the next time for resetting the watchdog timer can be expected, whereby such functionality provides for dynamic scaling of watchdog timeouts by a remote device.

In the present illustrative example, the communication 446 may also be encrypted, for example using AES-128. The encrypted communication 446 is transmitted to the client device 401 via wireless link 407 e.g. over BLE, whereby it is passed to the trusted region 404 and verified and decrypted (e.g. using the server's public key).

Encryption is optional, and is provided to protect the flags, code and/or data within the communication 446 (e.g. to prevent third parties identifying the values of the flags or intercepting the code.) Furthermore, it will be appreciated that suitable methods may be used to protect the information within the communication from the server. For example, a secure checksum may be used to further protect/validate the time or counter values e.g. using SHA-3.

On decrypting and verifying that the communication 446 was sent by the server, the time value is compared to time value from timer 421 by comparator 424.

As described above, if the time value within the communication 446 received from the server 402 is confirmed as matching the time value generated by timer 421, then the crypto-watchdog 405 is configured to reset the watchdog timer 406. However, the flags may also provide an instruction for the crypto-watchdog 405.

For example, as described above, the flags may indicate that the crypto-watchdog 405 should not effect a reset of the watchdog timer 406, e.g. if a status update 433 received by the server 402 indicates that the public region 403 is infected with malware, and should instead reset the client device and/or reflash the client device.

Therefore, on receiving the control flags, the crypto-watchdog 405 is operable to action the control flags. If the control flags relate to instructions for the client device 401, then the crypto-watchdog 405 instructs the control device 401 accordingly, e.g. by writing data to a target register on the client device 401 to effect the instruction specified by the flag or by using a secure API. It will be appreciated that the nonce or counter values could be used instead of the time values as described above.

FIG. 8b schematically shows a communication 446 according to an embodiment. The communication 446 comprises a data packet 448, which comprises the data to be verified by the client device 401 such as, for example, a cryptographic nonce, a time value or counter value. The data communication 446 also comprises n-bit control flags 431, software code 435 (e.g. reason code relating to a flag value) and/or data 437 (e.g. firmware, cryptographic keys, security rules, virus behaviour patterns, certificates etc.).

The communication 446 is signed, for example using a suitable cryptographic signature 447, and is optionally encrypted 449. The cryptographic signing and optional encryption may be performed using any suitable cryptographic method as previously described, whereby the client device is operable to verify and decrypt the data communication. It will be appreciated that FIG. 8b is for illustrative purposes only and the communication 446 may comprise any other frames as required, for example as discussed previously.

The crypto-watchdog may be implemented on a device using hardware or software or a combination of both hardware and software.

FIG. 9 schematically shows a communication between a server 454 and nodes 451 (e.g. routers (WiFi routers, BLE routers and/or data processing devices e.g. embedded devices) in a network 450 according to an embodiment. In the present embodiment the network is a mesh network, whereby the nodes 451 each comprises a crypto-watchdog 453, whereby the nodes 451 require a verifiable communication from a server 454 to the reset a watchdog timer associated with the crypto-watchdog 453.

The server 454, in communication with a first node (N1), which may be a boarder router, is operable to transmit a verifiable communication comprising a time value to the first node (N1), whereby the verifiable communication is verified and the time value compared to a time value generated on the node (N1), as described above, whereby if the communication is verified by the first node (N1), the first node (N1) is configured to reset the watchdog timer thereon.

Furthermore, the first node (N1) rebroadcasts the verifiable communication received from the server to one or more nodes in the mesh network (e.g. N2 and/or N3), which in turn rebroadcast the communication until the all of the nodes in the mesh network receive the verifiable communication and are operable to reset the respective watchdog timers on verifying the verifiable communication.

It will be appreciated that the period between resetting the watchdog timer of each node and timeout should be greater than the period it takes for the communication to be broadcast from the server 454 thereto.

It will be also appreciated that all nodes will be provided with a secret shared with server, e.g. the server's public key, which may be provisioned by a manufacturer or by the server itself as described above.

If a node cannot verify the verifiable communication (e.g. the signature cannot be verified or the time value does not match), then that is indicative of an anomaly in the mesh network e.g. a node may be compromised.

Each node is also operable to generate status updates as described above, and communicate the status update to the server 554 e.g. as a secure end-to-end to communication through the nodes. The server 554 is operable to determine which node(s) is compromised by analysing the status updates received from each node, for example by identifying anomalies in node traffic activity in the mesh network, or by a lack of communication with a node.

FIG. 10 schematically shows an illustrative example of a client device 460 in communication with a cloud service 461 on a network e.g. the internet via node 462 and a router 463 (e.g. a boarder router) in a local network. The client device 460 may communicate with the node 462 using any suitable communications protocol, e.g. via BLE, ZigBee.

The node 462 may further communicate with the router 463 using any suitable communications protocol, e.g. via BLE, ZigBee, or WiFi, whilst the router 463 may communicate with the cloud service 461 using any suitable communications protocol, e.g. Ethernet, 3G cellular.

The client device 460, node 462 and router 463 each comprise a crypto-watchdog as previously described, which may each be reliant on communications from the cloud service 461 to reset an associated watchdog timer.

In the illustrative embodiment, the watchdog timer of the client device 460 will timeout if the client device 460 fails to receive a communication from the cloud service 461, and the crypto-watchdog may initiate a response operation, such as a security related action or a recovery operation as previously described.

In the present embodiment, on timeout, the crypto-watchdog 464 initiates a boot to a recovery mode, whereby the recovery mode provides for communication between the client device 460 and the node 462 and/or router 463 to undertake a challenge-response mechanism therewith.

In a further embodiment, the crypto-watchdog may not boot to a recovery mode, but may gain ownership of the communication circuitry to control communications between the client device and the server (e.g. using memory protection circuitry), whereby a software component, such as a recovery stack may be implemented to identify the source of the anomaly or request an update from the device.

The node 462 and/or router 463 may each comprise ID authentication data, which indicates to the client device 460 that the node 462 and/or router 463 are authenticated to reset the watchdog timer thereon.

In the present embodiment, the node 462 and router 464 each comprise respective certificate chains 465 and 466 as ID authentication data. However, any suitable authentication data may be used, for example, a shared cryptographic key.

At least one certificate in the certificate chains 465, 466 may be signed by a party trusted by the client device 460, such that, on receiving the certificate chains 465, 466 the node 462 and/or router 463 may be authenticated to reset the watchdog timer of the crypto-watchdog 464.

In the present embodiment, the client device 460 may be sent individual certificates for authentication, or may be sent the full certificate chains 465, 466.

It will be appreciated that, instead of sending the actual certificates in the certificate chains 465, 466, a hash value representative of the certificates in the certificate chains 465, 466 may be sent to the client device 460 for authentication to reduce amount of transmitted data.

If the client device 460 is unable to authenticate the identity of the node 462 and/or router 463 based on a received certificate, it may request further certificates from the node 462 and/or router 463 until the node 462 and/or router 463 are authenticated.

If the node 462 and/or router 463 do not have a certificate signed by a party trusted by the client device 460, the node 462 and/or router 463 will not be authenticated and will not be capable of resetting the watchdog timer of the crypto-watchdog 464.

In the present embodiment, on booting to recovery mode the client device undertakes a challenge response mechanism to the node 462 as described above. If the node 462 is authenticated, and communication therewith confirmed e.g. by return of the cryptographic nonce and the required certificate chain, the communication problem can be determined to be between the node and the cloud service 461, and the likelihood of the client device 460 being compromised is reduced. The crypto-watchdog 464 may then initiate a reboot to the operating firmware.

The client device 461 may also communicate with the router 463 and undertake a challenge response mechanism therewith. If the router 463 is authenticated as described above, and communication therewith confirmed, e.g. by return of the cryptographic nonce, then the communication problem can be determined to be between the router 463 and the cloud service 461, and the likelihood of the client device 460 being compromised is further reduced. The crypto-watchdog 464 may then initiate a reboot to the operating firmware.

Furthermore, as the node 462 and router 463 are authenticated, the crypto-watchdog 464 can then receive the communication required to reset the watchdog timer from the node 462 or router 463 until the communication with the cloud service 461 is re-established, or, once the node 462 and/or router 463 are authenticated, the crypto-watchdog 464 can continue to communicate with the node 462 or router 463, even after the communication with the cloud service 461 is re-established. Furthermore, the client device 460 may request and receive firmware updates from the node and or the router as required.

In a further illustrative example, the crypto-watchdog 464 may require communications from a threshold number of apparatuses/devices in a network to reset the watchdog timer.

For example, if communication with the cloud service 461 is lost and a timeout occurs, the client device 460 may authenticate nodes 462, 467 and 468 and router 463 e.g. using certificate chains as described above.

To reset the watchdog timer using the nodes 462, 467 or 468 or router 463, the crypto-watchdog may require a threshold number of communications from the nodes/router. For example, in the illustrative example, the client device 460 may require separate communications from at least 2 different devices in the network. If a communication is received from only one node 462, 467 or 468, the watchdog timer may reset. If a communication 464 is received from the threshold, then the watchdog timer may be reset.

However, the crypto-watchdog 464 can define a time limit with which the client device 460 can communicate with the nodes or router before timeout. For example, the crypto-watchdog may set a timeout period, e.g. 6 hours, after which period the crypto-watchdog will require a communication from the cloud service 461 to prevent timeout or to reset.

In an embodiment, on timeout, any keys maintained locally on the client device 461 may be erased, and provisioned, for example, by the cloud service 461 once communication is re-established.

In a further illustrative embodiment, the crypto-watchdog allows a remote device/apparatus/service, for example, a trusted server to define device functionality or provide additional device functionality for a data processing device in communication therewith.

For example, the instructions/commands within communications from the server to the client device may include instructions relating to the capabilities/functions/features of client devices which may be permitted or restricted for a predetermined period of time, which, depending on the requirements of the client device, could range from seconds, minutes, hours and/or days, or until subsequent reconnection with a trusted server is restored. Alternatively, capabilities/functions/features, may be permitted or restricted when connection to a trusted server is lost for a period of time.

Such capabilities are useful in many environments. By way of an illustrative example, in an office environment of a business, the client device may be an item of office equipment, identification card, person envoy device identifying a person, or a sensor that the business intends only to enable or permit access to within a designated area/network (e.g. within the office location or behind a corporate firewall/internal network). Therefore the client device is configured to communicate with a server to undertake a challenge-response to reset the watchdog timer only when within the designated area.

Outside of the designated area, access to the server will not be possible (unless authorised by the business, for example, over a secure VPN). Therefore, whilst within the designated area, the client device is in communication with the server and will undertake a challenge-response mechanism to reset the watchdog timer. However, outside the designated area, the client device will not receive any communications from the server, and the watchdog timer will timeout. In the present example, it will be appreciated that the watchdog timer may have a short timeout duration e.g. 60 seconds such that when outside the designated area the watchdog timer will reset, and for example, the device will be rendered non-functional until communication with the server is restored.

In a further illustrative example, a client device having a crypto-watchdog may provide dynamic scaling of its timeout based on information received in communications from a remote device. The client device may then set the timeout period based on analysis of the information in the communications.

For example, the client device may be an embedded device which undertakes challenge-response communications with a mobile phone. The mobile phone may provide information, such as location based information (e.g. GPS coordinates) within the communications sent to the client device.

The client device may determine its position relative to a target e.g. a house of the owner of the embedded device, and, if the client device is within a safe zone e.g. 20 metres from the target, the crypto-watchdog may set a first timeout period. However, if the embedded device determines that it is outside the safezone, e.g. >20 m from the target, the crypto-watchdog may modify the timeout period, e.g. to shorter timeout periods. Once returned to the safezone, the crypto-watchdog can modify the timeout period. It will also be appreciated that the instructions to modify the timeout period may be provided by the remote device.

The crypto-watchdog also permits rental/lease models to be adopted, providing temporary use and access to capabilities/functions/features of a client device for a user, irrespective of the network connection. For example, a device, or features of that device, may be permitted to be used over defined period, for example 24 hours, after which further authorisation must be obtained by the client device.

The watchdog timer may be configured to timeout after 24 hours, whereby the period to timeout may be defined by the server, for example, as an instruction/command in a communication from the server. After timeout, the device may, for example, be rendered non-functional, reset, reflashed, or provide limited functionality.

Prior to timeout during the 24 hour period, should the user need to perform a reset of the client device, or if the client device is compromised and a reflash of the firmware is initiated by the crypto-watchdog, access to the particular functionality may still be permitted following reconnection to the server, for example by generating a status update as described above, whereby the status update may further comprise a request for reauthorisation from the server, with permission being granted whilst within the 24 hour period.

In a further illustrative example, the status update may comprise a request for extended authorisation from the server. For example, the user of the client device may subscribe to a web service for additional access to the authorised functionality of the client device, whereby, on receiving the status update, the server in communication with the client device and the web service verifies the subscription with the web service. If the user is authorised, the server may provide an instruction/command to extend the timeout period. In a further example, the server may automatically generate a communication comprising a command/instruction extending the timeout period without the need for the status update. For example, if the web service instructs the server to extend the timeout period.

After timeout, the server may determine whether the particular client device/function should be reauthorized, and, if so, the server may not respond to requests from the crypto-watchdog or respond to decline authorisation, thereby prevent a reset of the watchdog timer of the crypto-watchdog as described above.

In a further illustrative example, the server is a handheld device operable to be carried by a user.

In a further illustrative example, a one-use device comprising a crypto-watchdog, is operable, on timeout or under instruction from a server, to render the device non-functional e.g. by causing a fuse-bit in the device to blow such that the operating firmware is inaccessible.

By way of a further example, a device may provide functionality only accessible on payment of an additional fee. This may be useful in situations where, for example, a device is manufactured to be usable in multiple regions but which, by default firmware provided thereon, is localised to a particular geographic region (for example, a country).

FIG. 11 schematically shows an illustrative example of a client device 501 in communication with a server 502 according to an embodiment. Client device 501 comprises communications circuitry to provide wireless connectivity over, for example 2G/3G/4G. In the present example the client device 501 is a smartphone having an processing element 506 which runs applications 507, whereby the client device 501 comprises 2G/3G/4G protocol stacks 503, but, whereby the device defaults to enabling access to a default communication stack (e.g. 2G).

On payment of a fee, which may vary depending on whether temporary or permanent access is required by a user, additional functionality may be authorised by the server 502.

In the present example, the client device 501 communicates with server 502 (e.g. via WiFi, 2G, 3G, 4G), whereby the server 502 transmits a command/instruction to the crypto-watchdog to provide the additional functionality, for example to retrieve a non-default protocol stack (e.g. 4G), and/or to transmit updated firmware which provides the authorised functionality, and/or to instruct the watchdog timer to timeout after a defined period.

In a further illustrative example, the server is capable of disabling functionality after a period of time if so desired, for example by sending a command/instruction to the crypto-watchdog to reset the device to default firmware which provides limited functionality.

FIGS. 12a and 12b illustrate one approach to using a client device having a crypto-watchdog as described herein requiring access to functionality.

At step 10 the client device requests access to a particular function (fn) (e.g. as a result of a user input). At step 20 the client device 20 will check if access to the particular functionality is permitted or whether the functionality is available for use. If the functionality is already permitted/available for use, the functionality will be available/permitted until timeout of the watchdog timer.

If the functionality is not available, then the client device, at step 40, issues a request to the server for permission to access the functionality, which may include a request to reset the watchdog timer. At step 50, the server determines whether the requested functionality is permitted (e.g. is the user authenticated to access the requested functionality). If not, the server, at step 60, performs a security related action (e.g. issues a command/instruction to instruct the crypto-watchdog to prevent access to the functionality).

Steps 40 and 50 may incorporate the methodology described herein in order to determine whether operation should be maintained/functions permitted or if an action needs to be taken to reset/deactivate/reflash (or any other chosen response in response to a failure to provide the authentication) in response to a failure to communicate or a rejected/non-authenticated response.

If the server determines that access to the requested functionality is allowed, it is determined at step 70 whether the functionality is available to the device and requires activation, or whether the functionality is required to be provided to the device e.g. by transmitting firmware to the device. If firmware is required to be provided to the device, it is transmitted to the device at step 100, using for example end-to-end communications as previously described herein. If the firmware is on the device already (e.g. provisioned at manufacture), but is not enabled, then at step 110 the client device determines whether the existing firmware is required to be reflashed with the provisioned/downloaded firmware. If so, the existing firmware is reflashed at step 120, and the functionality/feature is permitted for use.

Thus there is also provided a method of controlling access to one or more features of a client using the crypto-watchdog, wherein control may be time limited and/or access to one or more features.

There is also provided a server capable of controlling access to one or more features of a client device. The above method is particularly beneficial as even if access is made to the code operating on the less-secure region, then once a device timeout is initiated from the server the client device will reset; further if the code is attempted to be used on another device, then the device/functionality will not be registered with the server.

FIG. 13a schematically shows an example of a client device 601 in communication with a server 604 and FIG. 13b schematically shows an example of memory 614 of the client device 601 according to an embodiment.

The client device 601 comprises a processor 602, and a crypto-watchdog 605 which provides the crypto-watchdog functionality as previously described. In the present embodiment the crypto-watchdog 605 comprises a hardware module in communication with the processor 602.

Furthermore the client device 601 is configured to provide secure end-to-end communications as previously described, and whereby the device comprises trusted and untrusted components.

As will be appreciated the client device 601 comprises communication circuitry (not shown) for communication with a trusted server 604 using any suitable communications protocol (e.g. BLE, 3G, WiFi, Ethernet).

It will be appreciated that the processor can boot from multiple boot sources e.g. NAND flash 606, SPI flash 608, Internal ROM 614 or an external drive e.g. (USB stick not shown), a different memory address within the same memory device, and/or a secure or less secure memory region, whereby, the boot source which is used is determined, for example, by setting a boot pin or signal (not shown). It will be appreciated that the crypto-watchdog 605 may be configured to change the boot source which the processor boots from based on instructions/commands in a communication(s) received from the server, and/or the crypto-watchdog may be configured to guard the flash write protection, whereby a communication comprising a shared secret and commands/instructions from the trusted server 604, may unlock the flash for updating the firmware. Therefore, the server may remotely unlock the flash for updating the firmware, if, for example, the integrity of the client device 601 is deemed as safe, so malware can't use that opportunity to turn persistent. Status updates may be provided to the trusted server 604 from the client device 602 to enable the server 604 to detect any anomalies on the client device.

In the present example, the processor 602 boots from a NAND flash 606 having operating firmware thereon. However, on timeout of the watchdog timer, (for example due to detecting an anomaly in the operation of the client device, e.g. due to malware being detected on the device or an incorrect firmware being loaded into the NAND flash 606), communication with the server 604 may be lost, such that the crypto-watchdog 605 may perform a response action whereby the processor 602 is instructed to boot from the SPI flash 608 which has a different firmware thereon.

In the present embodiment, the firmware on the SPI flash 608 provides a recovery mode for the client device 601, as previously described, whereby the recovery mode may provide different/limited device functionality in comparison to the operating firmware.

In the present embodiment, the recovery mode enables communication between the client device 601 and the server 604 (e.g. over WiFi, BLE, ZigBee etc.), such that the client device 601 can provide a status update to the server 604 identifying the anomaly. On receiving the status update, the server 604 is configured to provide firmware to the client device 601 as previously described. On receiving the firmware update from the server 604, the firmware update is used to reflash the NAND flash 606, whereby the crypto-watchdog 605 instructs the processor 602 to boot from the NAND flash 606.

In a further illustrative example, the crypto-watchdog 605 may set the boot source on receiving an instruction/command from a trusted server 604. For example, the server 604 may transmit a command/instruction (e.g. set a flag) to instruct the crypto-watchdog 605 to force the application processor 602 to boot from a specific boot source e.g. the SPI flash 608. Such functionality is useful, for example, on receiving a status update indicating that the less-trusted region is compromised by malware, the server 604 may remotely instruct the processor 602 to boot to a recovery mode as described above, whereby the client device 601 may download an updated version of firmware from the server 604 which is used to reflash the NAND flash 606. Once the update is complete, the application processor is set to reset and boot from the NAND flash 606 having the updated firmware therein.

In a further example, the server may transmit a command/instruction to instruct the crypto-watchdog 605 to force the application processor to boot from an external device such as a pen drive (e.g. a USB drive) which a field engineer inserts into the client device, thereby providing remote enabling of an external boot source. Such functionality, may, also for example, allow a field engineer to reflash the client device using firmware on the USB drive. The server may request a status update from the crypto-watchdog 605 before allowing the application processor to boot from the external drive, for example to verify that there is no malware on the client device before updating firmware from an external source.

Whilst switching between flash memory boot sources is described above, it will also be appreciated that the crypto-watchdog 605 may also instruct the application processor 602 to switch between different versions of firmware in memory, e.g. ROM 614. For example, firmware (FWa) 616 may provide certain features/functionality, whilst firmware (FWb) 617 may provide alternate or overlapping features/functionality. Therefore, in the present embodiment, the particular firmware which is to be used by the processor 602 may be defined by the crypto-watchdog 605, or may be defined by the sever 604 on detecting an anomaly.

Furthermore, it will be appreciated that for hardware implementations of the crypto-watchdog, the shared secret may be written to a register(s) of the crypto-watchdog, whereby the register(s) are protected from software reading the register(s). In embodiments, the registers may be a write-once register, whereby fuses provide the write-once property, or write protection may be reset by a cold boot.

The crypto-watchdog may comprise a non-volatile and/or volatile memory for storing secrets and states, whereby the volatile memory may comprise a dedicated battery to maintain the volatile memory. It will be appreciated that if a party attempted to tamper with the crypto-watchdog e.g. by removing it from the client device, then power to the volatile memory would be removed and the data therein erased.

FIG. 14, schematically shows an IoT device 700 in communication with a server 702 according to an embodiment;

In the present embodiment, the IoT device 700 is provided with a processing element 704 in the form of a system on chip 704 device incorporating secure elements such as those previously described, for example trusted containers, processes, hardware.

The system on chip 704 incorporates secure and protected data elements, such as cryptographic keys and a shared secret.

The IoT device 700 may also include a separate memory area (which may or may not be part of the same SoC) which provides application space for various aspects of functionality.

Such devices may be delivered with or without provisioning of the device firmware 708, but in either case and to mitigate against an interdiction attack, a default mode of operation may be for the IoT device 700 to initially operate in a secure recovery mode, whereby limited device functionality is provided to communicate with the server 702, upon which firmware may be downloaded from the server 702 by secure end-to-end communications as described above, whereby the provisioned firmware is signed and/or encrypted using any suitable method. As will be appreciated, the firmware received at the IoT device 700 will be passed to a trusted region of the SoC 704 and decrypted and verified. When verified, the firmware can be used to flash the IoT device e.g. memory 708.

Additionally or alternatively, the IoT device 702 may be provided with firmware by a manufacturer before deployment. Therefore, on deployment, the SoC device 700 may verify the provisioned firmware to check for anomalies as described above.

It will be appreciated that the same techniques described above in relation to data processing devices are also applicable to other devices, including gateways and servers. In the case of a server, for example, an SoC, or a main CPU may boot into a secure recovery mode and then transfer usage rights to a customer of a cloud provider. That transfer of ownership may then allow a customer to safely upload a recovery image which enables control over the server. The security may be created by the cloud owner transferring control to a customer for example. The secured system may then reliably transfer control to the customer's recovery image and thereby provide an environment in which the owner of the machine may be prevented from tampering with the uploaded recovery image. In embodiments a cloud provider/server may be able to inhibit a customer by resetting or retaking control of the machine. Due to encryption of memories with a randomly created key upon control transfer, the customer's data may then be inaccessible to the cloud provider/hardware/server.

The description provided above and the accompanying drawings are intended to illustrate the functions of the present examples and the sequence of steps for constructing and operating the present examples. It is not intended to represent the only forms in which the present examples may be constructed or utilised. However the same or equivalent functions and sequences may be accomplished by different examples.

Whilst the embodiments above primarily illustrate the described functionality in relation to embedded client devices and servers, it will be appreciated that any suitable devices could be utilised to provide the described functionalities.

Various techniques may be employed to detect malware on such devices, example metrics of which have been set out above. Further examples include the use of statistical analysis techniques, blocking known malicious signatures, instrumenting and monitoring node activities, comparing node activities, monitoring node traffic activity. Responses may include various actions include disabling communication, revoking keys, reset and re-flash, creating a secure tunnel between a client device and a server isolated from other devices, rerouting communications, node instrumentation, Die-Sensors or external watchdogs measuring system behaviour, signing of external/trusted measurements including timestamps, feeding signed/encrypted measurements back to an applications processing element which is responsible for sending the measurements back to centralized servers. It will be appreciated however that techniques for detection and responding are not limited to the described and illustrated examples and other techniques may be possible.

The various functions described herein can be carried out in any desired and suitable manner. For example, the functions described herein can be implemented in hardware or software, as desired. Thus, for example, unless otherwise indicated, the various functional elements may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

The examples described herein also extend to a computer software carrier comprising such software which when used to operate a system comprising data processing means causes in conjunction with said data processing means to carry out the steps of the methods of the present techniques. Such a computer software carrier could be a physical storage medium such as a ROM chip, CD ROM, RAM, flash memory, or disk, or any other suitable means.

It will further be appreciated that memory can be considered, in some examples, a computer (or processor)-readable storage media configured to store instructions that, when executed by the processor, cause the device to operate in accordance with techniques described herein. In some examples, the memory circuitry can be considered a non-transitory storage medium. The term "non-transitory" can indicate that the storage medium is not embodied in a carrier wave or a propagated signal. In certain examples, a non-transitory storage medium can store instructions that can, over time, change.

It will further be appreciated that not all steps described herein need be carried out by computer software and thus from a further broad aspect the present techniques can be implemented by computer software and such software installed on a computer software carrier for carrying out at least one of the steps set out herein.

The embodiments described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality as previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave.

Any range or device value given herein may be extended or altered in an appropriate manner, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Any reference to an item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described in detail above, or with reference to one or more individual embodiments, those skilled in the art could make numerous alterations to the disclosed embodiments without departing from the intended scope of the disclosure.

The invention claimed is:

1. A method of controlling a data processing device having a trusted region and a less-trusted region, the method comprising:
    generating, at the trusted region, a challenge communication;
    encrypting, at the trusted region, the challenge communication;
    passing, from the trusted region to the less-trusted region, the encrypted challenge communication;
    sending, from the less-trusted region to a remote device, the encrypted challenge communication;
    receiving, at the less-trusted region, an encrypted response communication from the remote device, wherein the encrypted response communication comprises verification data and command data, and wherein the command data comprises one or more instructions to cause a watchdog of the trusted region to perform one or more actions in response to the one or more instructions and where the verification data comprises a response to the challenge communication;
    passing, from the less-trusted region to the trusted region, the encrypted response communication from the remote device;
    decrypting, at the trusted region, the encrypted response communication from the remote device;
    verifying the verification data at the trusted region;
    initiating an action by the watchdog when the response to the challenge corresponds to an expected solution to the challenge, wherein the command data in the communication from the remote device specifies the action to be initiated.

2. A method according to claim 1, the method further comprising:
    wherein an instruction of the one or more instructions is to allow a watchdog timer associated with the watchdog to timeout.

3. A method according to claim 1, the method further comprising:
    if the verification data is not verified, initiating a security related action.

4. A method according to claim 1, wherein the verification data comprises a synchronised time value or counter value.

5. A method according to claim 4, wherein the communication further comprises a verifiable identifier associated with the remote device.

6. A method according to claim 5, wherein the verifiable identifier comprises a cryptographic signature of the remote device.

7. A method according to claim 6, the method further comprising:
    verifying the signature at the data processing device.

8. A method according to claim 1, wherein the one or more actions comprise initiating a response operation.

9. A method according to claim 8, wherein the response operation comprises setting a timeout period for the watchdog timer.

10. A method according to claim 8, wherein the response operation comprises:
    setting a boot source for a processing element associated with the data processing device or controlling access to a region of memory associated with the data processing device.

11. A method according to claim 8, wherein the response operation comprises:
    generating a request for code capable of executing on the data processing device; and causing the data processing device to transmit the request for code to the remote device.

12. A method according to claim 11, wherein the code capable of executing on the data processing device comprises firmware.

13. A method according to claim 1, wherein the verification data comprises a cryptographic nonce.

14. A method according to claim 1, the method further comprising:

generating, using the watchdog, a status update;
transmitting the status update to the remote device.

15. A method according to claim 1, the method further comprising:
receiving, at the data processing device, a further communication from the remote device, wherein the further communication comprises at least one credential;
determining, using the watchdog, an authentication status of the at least one credential.

16. A data processing device comprising a processing unit, memory circuitry having a trusted region and a less-trusted region, communications circuitry and a watchdog of the trusted region having a watchdog timer associated therewith, wherein the data processing device is configured to:
generate, at the trusted region, a challenge communication;
encrypt, at the trusted region, the challenge communication;
pass, from the trusted region to the less-trusted region, the encrypted challenge communication;
sending, from the less-trusted region to a remote device, the encrypted challenge communication;
receive, at the less-trusted region, an encrypted response communication from the remote device, wherein the encrypted response communication comprises verification data and command data, and wherein the command data comprises one or more instructions to cause the watchdog to perform one or more actions in response to the one or more instructions and where the verification data comprises a response to the challenge communication;
pass, from the less-trusted region to the trusted region, the encrypted response communication from the remote device;
decrypt, at the trusted region, the encrypted response communication from the remote device;
verify the verification data at the watchdog;
initiate an action by the watchdog when the response to the challenge corresponds to an expected solution to the challenge, wherein the command data in the communication from the remote device specifies the action to be initiated.

17. A non-transitory, computer-readable storage medium storing at least one computer program configured to control a data processing device having a trusted region and a less-trusted region to:
generate, at the trusted region, a challenge communication;
encrypt, at the trusted region, the challenge communication;
pass, from the trusted region to the less-trusted region, the encrypted challenge communication;
sending, from the less-trusted region to a remote device, the encrypted challenge communication;
receive, at the less-trusted region, an encrypted response communication from the remote device, wherein the encrypted response communication comprises verification data and command data, and wherein the command data comprises one or more instructions to cause a watchdog associated with the data processing device to perform one or more actions in response to the one or more instructions and where the verification data comprises a response to the challenge communication;
pass, from the less-trusted region to the trusted region, the encrypted communication from the remote device;
decrypt, at the trusted region, the encrypted response communication from the remote device;
verify the verification data at the watchdog;
initiate an action by the watchdog when the response to the challenge corresponds to an expected solution to the challenge, wherein the command data in the communication from the remote device specifies the action to be initiated.

18. A method of activating a functionality on a data processing device having a trusted region and a less-trusted region, the method comprising:
generating, at the trusted region of the data processing device, a request communication comprising a request to access a restricted functionality of the data processing device, the request communication further comprising a challenge;
encrypting, at the trusted region, the request communication;
passing, from the trusted region to the less-trusted region, the encrypted request communication;
sending, from the less-trusted region to a remote device, the encrypted request communication;
transmitting, from the less-trusted region to a remote device, the request communication;
receiving, at the less-trusted region, an encrypted authorisation communication from the remote device, wherein the authorisation communication comprises verification data and command data, and wherein the command data comprises one or more instructions to cause a watchdog associated with the trusted region to activate the restricted functionality at the data processing device in response to the one or more instructions and where the verification data comprises a response to the challenge communication;
verifying the verification data at the watchdog;
initiating an operation by the watchdog when the response to the challenge corresponds to an expected solution to the challenge, wherein the operation comprises activating the restricted functionality at the data processing device in accordance with the one or more instructions.

* * * * *